(12) United States Patent
Oztaskent et al.

(10) Patent No.: US 11,328,014 B2
(45) Date of Patent: May 10, 2022

(54) FRAME-ACCURATE AUTOMATED CUTTING OF MEDIA CONTENT BY USING MULTIPLE AIRINGS

(71) Applicant: GOOGLE LLC, Mountain View, CA (US)

(72) Inventors: Ant Oztaskent, Mountain View, CA (US); Yaroslav Volovich, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/756,319

(22) PCT Filed: Oct. 25, 2019

(86) PCT No.: PCT/US2019/058175
§ 371 (c)(1),
(2) Date: Apr. 15, 2020

(87) PCT Pub. No.: WO2021/080617
PCT Pub. Date: Apr. 29, 2021

(65) Prior Publication Data
US 2021/0124777 A1    Apr. 29, 2021

(51) Int. Cl.
*G06F 16/783* (2019.01)
*G06F 16/14* (2019.01)
(Continued)

(52) U.S. Cl.
CPC ........ *G06F 16/7837* (2019.01); *G06F 16/152* (2019.01); *H04N 21/23418* (2013.01); *H04N 21/434* (2013.01); *H04N 21/44008* (2013.01)

(58) Field of Classification Search
CPC .............. G06F 16/7837; G06F 16/152; G06F 16/7847; G06F 16/483; H04N 21/23418;
(Continued)

(56) References Cited

U.S. PATENT DOCUMENTS

| | | | |
|---|---|---|---|
| 8,196,164 B1 | 6/2012 | Oztaskent et al. | |
| 10,524,000 B2* | 12/2019 | Lee | H04N 21/84 |
| 2002/0083440 A1* | 6/2002 | Dupuis | H04N 21/44008 |
| | | | 725/32 |

FOREIGN PATENT DOCUMENTS

EP    3 264 325 A1    1/2018

OTHER PUBLICATIONS

International Search Report and Written Opinion for PCT Appln. Ser. No. PCT/US2019/058175 dated Mar. 12, 2020 (18 pages).

\* cited by examiner

*Primary Examiner* — Asghar H Bilgrami
(74) *Attorney, Agent, or Firm* — Marshall, Gerstein & Borun LLP

(57) ABSTRACT

At least one aspect of the present disclosure is directed to systems and methods of extracting media segments based on fingerprint matching. The method can include receiving a media stream comprising a plurality of frames and generating a plurality of fingerprints corresponding to each frames. The method can receive a target timestamp and determine a target fingerprint from the plurality that corresponds to the target timestamp. The method can retrieve candidate fingerprints, each of the candidate fingerprints corresponding to a frame in a candidate media stream. The method can compare the target fingerprint to the candidate fingerprints to determine a matching candidate fingerprint. The method can match fingerprints that correspond to media frames before and after the target fingerprint to determine the upper and lower bounds of a segment of interest. The method can extract the segment of interest based on the bounds and provide it to a respective party.

20 Claims, 7 Drawing Sheets

(51) Int. Cl.
*H04N 21/234* (2011.01)
*H04N 21/434* (2011.01)
*H04N 21/44* (2011.01)
*G06F 16/483* (2019.01)
*G06K 9/00* (2006.01)
*H04N 21/845* (2011.01)
*H04N 21/231* (2011.01)
*H04N 21/81* (2011.01)
*H04N 21/8352* (2011.01)

(58) Field of Classification Search
CPC .......... H04N 21/434; H04N 21/44008; H04N 21/23109; H04N 21/812; H04N 21/8352; H04N 21/8456; G06K 9/00744; G06K 9/00758

See application file for complete search history.

FRAME-ACCURATE AUTOMATED CUTTING OF MEDIA CONTENT BY USING MULTIPLE AIRINGS

CROSS-REFERENCE TO RELATED APPLICATIONS

The present application is a National Stage Application, filed under 35 U.S.C. 371, of International Patent Application No. PCT/US2019/058175 filed on Oct. 25, 2019 titled "FRAME ACCURATE AUTOMATED CUTTING OF MEDIA CONTENT BY USING MULTIPLE AIRINGS," the entirety of which is incorporated by reference herein.

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item.

SUMMARY

The present disclosure is generally directed to using a method to analyze media streams of varying length to identify and extract segments of interest. The segments of interest can be identified because they are repeated more than once in the media stream, or are present in other media streams. The present disclosure describes a method of identifying and extracting segments of interest in a frame accurate way while reducing processing and storage requirements compared to other approaches. Further, the method described herein can identify and extract segments from long media streams, and even media streams that are infinitely long.

The present disclosure is generally directed to a technical solution for identifying repeating segments in media streams using hashed fingerprint techniques. The method can receive a media stream, for example from a broadcast, or from a type of computer storage. The received media stream can include a plurality of video frames. Instead of individually analyzing the raw media content of each video frame, as in other solutions, the present solution can generate a fingerprint for each frame, the fingerprint representing both the respective frame and the frames within a period of time before or after the respective frame. For example, for each frame of the media stream, the method can generate a fingerprint that represents all of the frames within a window of three seconds after the respective frame.

To generate a fingerprint for a frame, the present solution can select a number of frames within a window of time before or after the frame in question. The number of frames can be predetermined or decided based on other factors. The frames can be selected based off of a predetermined or computed interval within the window of time. Each of the selected frames can be hashed using a hashing algorithm suitable for media hashing and comparison, for example a locality-sensitive hashing algorithm. After generation, each of the hashes can be truncated to a certain bit-width to reduce the size footprint of the final fingerprint. The fingerprint can be generated by concatenating each of the truncated hashes into a single value or data structure. The fingerprint that results for each frame in the present solution is unique to the frames in the window of time relative to the respective frame of the media stream. For example, if the window time period is determined to be three seconds after the selected frame, the method can perform the steps outlined above to generate a fingerprint for each frame that represents both the frame in question and the three seconds of media proceeding the frame. By generating media fingerprints in this way, the present solution provides a significant computational improvement to the comparison of two media streams while decreasing the required storage of media comparison data.

The present solution can aggregate the frames into a plurality of fingerprints that represent the entire media stream. The plurality of fingerprints can be stored in a database or other computer storage medium for analysis. The present solution can associate each of the plurality of fingerprints with a respective frame of the media stream, for example by order or by timestamp. The method can receive a target timestamp corresponding to a frame in the media stream, which can correspond to a frame within a segment of interest of the media stream. The present solution can determine the target fingerprint in the plurality of fingerprints representing the media stream that corresponds to the target timestamp. For example, the present solution can determine the fingerprint that corresponds to a period of time that includes the target timestamp. The present solution can select the target fingerprint such that the target timestamp represents the exact midpoint of the time period represented by the selected target fingerprint.

To determine if the segment of interest is repeated in other media streams, the present solution can retrieve a candidate plurality of fingerprints, each of the candidate plurality of fingerprints corresponding to a frame in a candidate media stream. The candidate media stream can, in some implementations, be the same as the first media stream. The present solution can compare the target fingerprint to each of the fingerprints in the second plurality of fingerprints to determine a match position in the second media stream. If a matching fingerprint is found, the method can then find additional matches before and after the match position of the target fingerprint. For example, the method can continue to match each of the fingerprints of the two media streams that correspond to a timestamp that is less than the match position of the target fingerprint. The present solution can continue to match fingerprints until a lower-bound of the timestamp of the segment of interest can be determined. Likewise, to determine an upper-bound of the segment of interest, the present solution can continue to match each of the fingerprints of the two media streams that correspond to a timestamp that is greater than the match position of the target footprint until a non-match occurs.

The present solution can use the upper-bound and the lower-bound to identify the segment of interest in either of the two media streams. The present solution can extract the segment of interest from the media streams. Because a fingerprint is made for each of the frames in both media streams, the extracted segment of interest is frame accurate across both media streams. The extracted segment of interest can then be stored in a database or provided to a party of interest.

At least one aspect of the present disclosure is directed to a method of extracting matching media segments based on frame fingerprints. The method can include receiving, by a data processing system having one or more processors, a media stream comprising a plurality of frames. The method can include, for each of the plurality of frames, selecting, by the data processing system, a second plurality of frames from the plurality of frames based on a fingerprint window value. The method can include, for each of the plurality of frames, hashing, by the data processing system, each of the second plurality of frames to create a plurality of hashes. The method can include, for each of the plurality of frames, truncating, by the data processing system, each of the plurality of hashes to generate a plurality of truncated hashes. The method can include, for each of the plurality of frames, concatenating, by the data processing system, the plurality of truncated hashes to calculate a frame fingerprint value. The frame fingerprint value can be associated with the respective frame in the plurality of frames and a timestamp corresponding to the respective frame. The method can include aggregating, by the data processing system, each of the calculated frame fingerprint values to assemble a plurality of fingerprints. The method can include receiving, by the data processing system, a target timestamp corresponding to a target frame in the plurality of frames. The method can include determining, by the data processing system, a target fingerprint in the plurality of fingerprints based on the target timestamp and the fingerprint window value. The method can include retrieving, by the data processing system, a second plurality of fingerprints, each of the second plurality of fingerprints associated with a frame in a second media stream. The method can include comparing, by the data processing system, the target fingerprint with each of the second plurality of fingerprints to determine a match position corresponding to a position in the second media stream. The method can include matching, by the data processing system, a first fingerprint in the plurality of fingerprints associated with a timestamp that is less than the target timestamp with a second fingerprint of the second plurality of fingerprints to determine a lower-bound timestamp. The method can include matching, by the data processing system, a second fingerprint in the plurality of fingerprints associated with a timestamp that is greater than the target timestamp with a third fingerprint of the second plurality of fingerprints to determine an upper-bound timestamp. The method can include extracting, by the data processing system, a media segment from the second media stream based on the lower-bound timestamp and the upper-bound timestamp. The method can include providing, by the data processing system, the media segment for storage in a database.

In some implementations, the method can include storing, by the data processing system, the plurality of fingerprints in a database. In some implementations, the method can include retrieving the second plurality of fingerprints from a database In some implementations, the method can include receiving, by the data processing system, a third media stream comprising a third plurality of frames. In some implementations, the method can include, for each of the third plurality of frames, selecting, by the data processing system, a fourth plurality of frames from the third plurality of frames based on the fingerprint window value. In some implementations, the method can include, for each of the third plurality of frames, hashing, by the data processing system, each of the fourth plurality of frames to create a second plurality of hashes. In some implementations, the method can include, for each of the third plurality of frames, truncating, by the data processing system, each of the second plurality of hashes to generate a second plurality of truncated hashes. In some implementations, the method can include, for each of the third plurality of frames, concatenating, by the data processing system, the second plurality of truncated hashes to calculate a second frame fingerprint value. In some implementations, the method can include aggregating, by the data processing system, each of the second frame fingerprint values, each associated with a timestamp corresponding to a respective frame in the third plurality of frames, to assemble the second plurality of fingerprints.

In some implementations, the method can include hashing each of the second plurality of frames using a locality-sensitive hashing algorithm. In some implementations, the second media stream is the same as the first media stream. In some implementations, the method can include calculating, by the data processing system, a similarity value between the target fingerprint and each of the second plurality of fingerprints.

In some implementations, the method can include determining, by the data processing system, whether the similarity value is equal to or greater than a similarity threshold. In some implementations, the method can include determining, by the data processing system, the match position corresponding to a position in the second media stream responsive to the similarity value being equal to or greater than the similarity threshold.

In some implementations, the method can include extracting, by the data processing system, a fifth plurality of fingerprints from the second plurality of fingerprints based on the lower-bound timestamp and the upper-bound timestamp. In some implementations, the method can include storing, by the data processing system, the fifth plurality of fingerprints in a database. In some implementations, the method can include providing, by the data processing system, the fifth plurality of fingerprints.

At least one other aspect of the present disclosure is directed to a system for extracting matching media segments based on frame fingerprints, comprising a data processing system having one or more processors. The data processing system can receive a media stream comprising a plurality of frames. The data processing system can, for each of the plurality of frames, select a second plurality of frames from the plurality of frames based on a fingerprint window value. The data processing system can, for each of the plurality of frames, hash each of the second plurality of frames to create a plurality of hashes. The data processing system can, for each of the plurality of frames, truncate each of the plurality of hashes to generate a plurality of truncated hashes. The data processing system can, for each of the plurality of frames, concatenate the plurality of truncated hashes to calculate a frame fingerprint value. The data processing system can aggregate each of the calculated frame fingerprint values, each associated with a timestamp corresponding to a respective frame in the plurality of frames, to assemble a plurality of fingerprints. The data processing system can associate each of the calculated frame fingerprint values with a respective frame in the plurality of frames. The data processing system can receive a target timestamp corresponding to a target frame in the plurality of frames. The data processing system can determine a target fingerprint in the plurality of fingerprints based on the target timestamp and the fingerprint window value. The data processing system can retrieve a second plurality of fingerprints, each of the second plurality of fingerprints associated with a frame in a second media stream. The data processing system can compare the target fingerprint with each of the second plurality of fingerprints to determine a match position corresponding to a position in the second media stream. The data processing system can match a first fingerprint in the plurality of fingerprints associated with a timestamp that is less than the target timestamp with a second fingerprint of the second plurality of fingerprints to determine a lower-bound timestamp. The data processing system can match a third fingerprint in the plurality of fingerprints associated with a timestamp that is greater than the target timestamp with a fourth fingerprint of the second plurality of fingerprints to determine an upper-bound timestamp. The data processing system can provide the media segment for storage in a database.

In some implementations, the data processing system is further configured to store the plurality of fingerprints in a database. In some implementations, the data processing system is further configured to retrieve the second plurality of fingerprints from a database.

In some implementations, the data processing system is further configured to receive a third media stream comprising a third plurality of frames. In some implementations, the data processing system is further configured to, for each of the third plurality of frames, select a fourth plurality of frames from the third plurality of frames based on the fingerprint window value. In some implementations, the data processing system is further configured to, for each of the third plurality of frames, hash each of the fourth plurality of frames to create a second plurality of hashes. In some implementations, the data processing system is further configured to, for each of the third plurality of frames, truncate each of the second plurality of hashes to generate a second plurality of truncated hashes. In some implementations, the data processing system is further configured to, for each of the third plurality of frames, concatenate the second plurality of truncated hashes to calculate a second frame fingerprint value. In some implementations, the data processing system is further configured to aggregate each of the second frame fingerprint values, each associated with a timestamp corresponding to a respective frame in the third plurality of frames to assemble the second plurality of fingerprints.

In some implementations, the data processing system is further configured to hash each of the second plurality of frames using a locality sensitive hashing algorithm. In some implementations, the first media stream is the same as the second media stream. In some implementations, the data processing system is further configured to calculate a similarity value between the target fingerprint and each of the second plurality of fingerprints.

In some implementations, the data processing system is further configured to determine whether the similarity value is equal to or greater than a similarity threshold. In some implementations, the data processing system is further configured to determine the match position corresponding to a position in the second media stream responsive to the similarity value being equal to or greater than the similarity threshold.

In some implementations, the data processing system is further configured to extract a fifth plurality of fingerprints from the second plurality of fingerprints based on the lower-bound timestamp and the upper-bound timestamp. In some implementations, the data processing system is further configured to store the fifth plurality of fingerprints in a database. In some implementations, the data processing system is further configured to provide the fifth plurality of fingerprints.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, methods, apparatuses, and systems of privacy preserving determination of intersection of sets of user identifiers. The various concepts introduced above and discussed in greater detail below may be implemented in any of numerous ways, as the described concepts are not limited to any particular manner of implementation.

Figure 1:
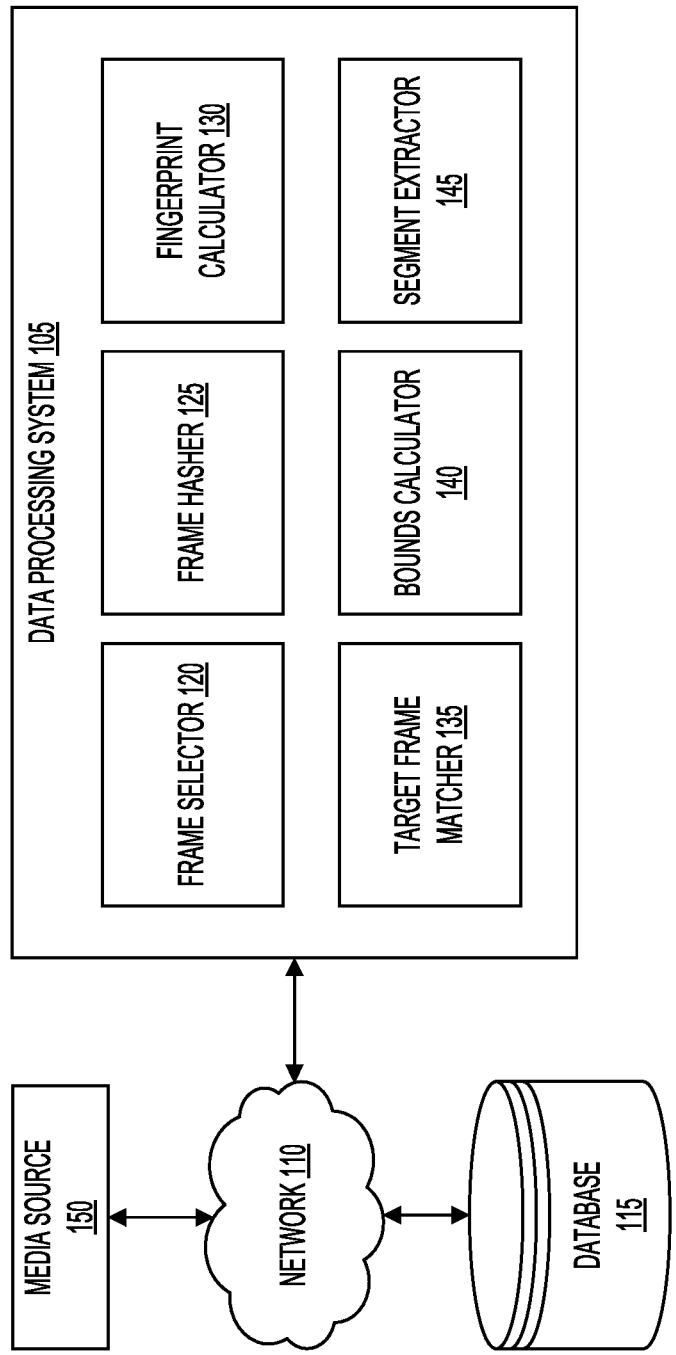
FIG. 1 shows a block diagram depicting an example environment for frame accurate extraction of media segments based on fingerprint matching.

FIG. 1 depicts a system or environment 100 to extract media segments based on frame-accurate fingerprint comparisons. The environment 100 can include at least one computer network 110. The network 110 can be a computer network, which can include one or more local area networks, a wide area network, private networks, public networks, and the Internet. The environment 100 can include at least one media source 150. The environment 100 can include at least one data processing system 105. The environment 100 can include at least one database 115. The data processing system 105 can include at least one frame selector 120. The data processing system 105 can include at least one frame hasher 125. The data processing system 105 can include at least one fingerprint calculator 130. The data processing system 105 can include at least one target frame matcher 135. The data processing system 105 can include at least one bounds calculator 140. The data processing system 105 can include at least one segment extractor 145. In some implementations, the data processing system 105 can include the media source 150. In some implementations, the data processing system 105 can include the database 115.

Figure 8:
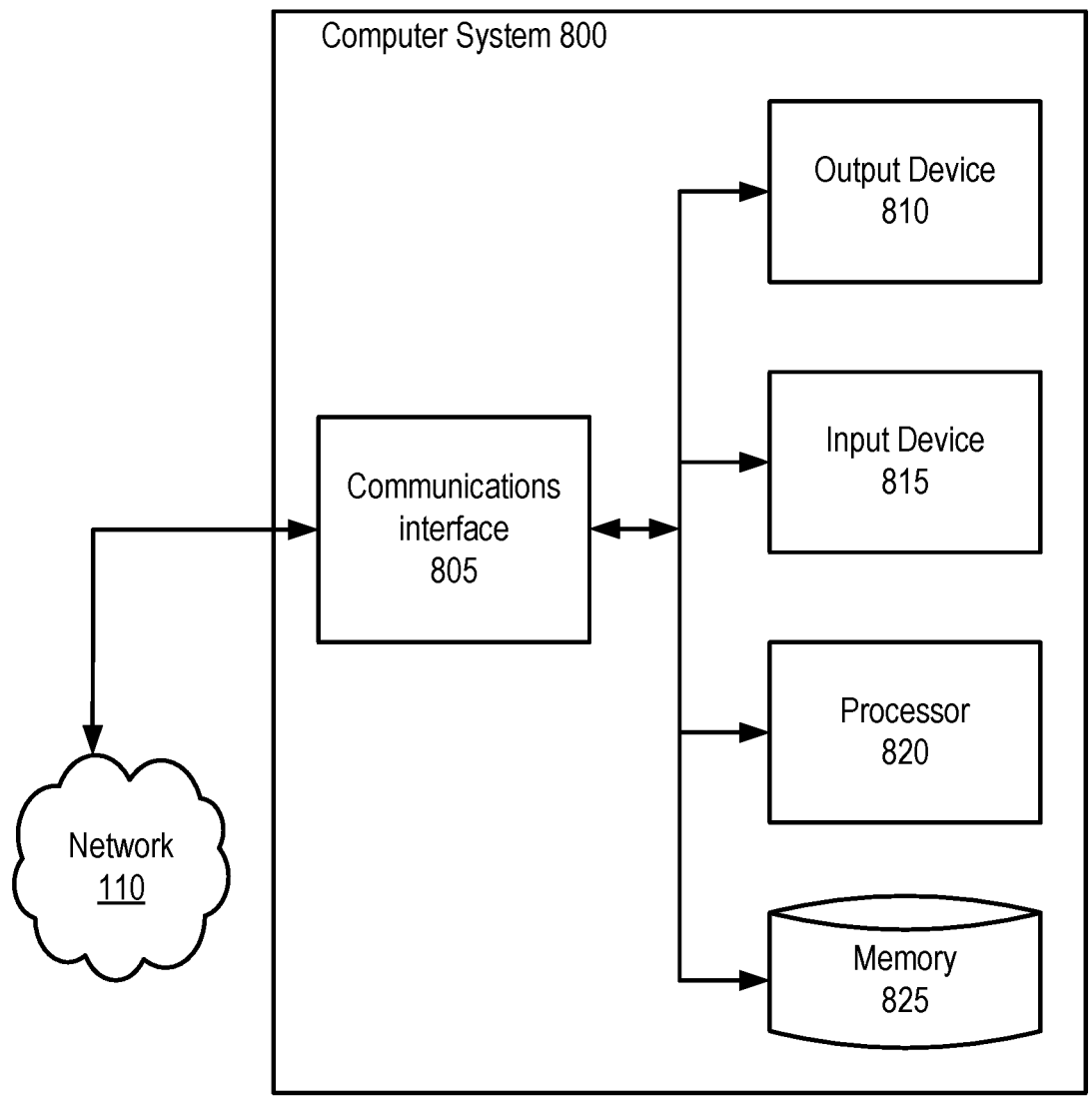
FIG. 8 shows the general architecture of an illustrative computer system that may be employed to implement any of the computers discussed herein.

Each of the components (e.g., the network 110, the database 115, the frame selector 120, the frame hasher 125, the fingerprint calculator 130, the target frame matcher 135, the bounds calculator 140, and the segment extractor 145 of the data processing system 105, and the media source 150) of the system 100 can be implemented using the components of a computing system 800 detailed herein in conjunction with FIG. 8. For example, the data processing system 105 can include servers or other computing devices. The media source 150 can also include servers or other computing devices. Each of the components of the data processing system 105 can perform the functionalities detailed herein.

The media source 150 can acquire, receive, or identify media streams (sometimes herein generally referred to as streams). Each media stream can include at least one media frame (sometimes herein generally referred to as a frame), which may be a frame of a video stream, for example MPEG-4 H.264 video. The frame can include video information, audio information, and closed caption information. The video information may be encoded using a video codec (e.g., H.263, H.264, HEVC, MPEG4, Theora, 3GP, Windows Media 8, Quicktime, MPEG-4, VP8, VP6, MPEG1, MPEG2, or MPEG-TS, etc.). The audio information can may be encoded using an audio codec (e.g., MP3, AAC, HE-AAC, AC3, EAC3, Vorbis, WMA, or PCM, etc.). The closed caption information may be encoded using a closed caption format (e.g., WEBVTT, CEA-608, CEA-708, DFXP, SAMI, SCC, SRT, TTML, or 3GPP, etc.). Each frame can include a timestamp that corresponds to its position in the media stream. The media stream may have a fixed number of frames per unit time, for example twenty-four frames per second. The media stream may be an adaptive bitrate stream. The media stream may be a live video stream, for example an internet video stream, or a live television stream. A live television stream may be received from a cable endpoint serviced by a cable provider, a satellite dish serviced by a satellite service provider, or a television antenna. In some implementations, the media source 150 may receive the media streams from one or more media sources, for example the Internet, a cable connection, satellite connection, radio broadcast, and/or television broadcast, among others. In some implementations, the media source 160 can retrieve one or more media streams from the database 115.

Each frame of the media stream acquired by the media source 150 can also include an index value (e.g., time or sequence number). The index value can correspond to the order of the frames included in the media stream. In some implementations, the index value may correspond to a time of the receipt of the frame by the media source 150. The media source 150 can generate and associate a time index to each frame in each media stream. The frames can be stored, for example, in a structured template, a region of memory in a computer system populated by certain values, or a generic data structure such as a class or C-like structure, among others. In some implementations, the media source 150 can decode the information in the media stream in addition to receiving the data in the media stream. In some implementations, the media source 150 can generate at least one media stream including one or more frames. For example, the media source 150 can be a computing system coupled with a camera sensor configured to record video and audio. In this example, the media source 150 can generate a media stream that includes frames with video and audio information, each of the frames associated with a timestamp.

The media source 150 can transmit the frames of the media stream to the data processing system 105 via the network 110 for processing. In some implementations, the media source 150 can transmit the frames of the media stream in a continuous stream. In some implementations, the media source 150 can provide the frames of the media stream on a regular interval of times (e.g., one frame every millisecond). In some implementations, the media source 150 can transmit frames on a variable time interval schedule. In some implementations, the media source 150 can provide the media stream to the data processing system in a burst. The burst can include many frames, each frame corresponding to a timestamp and/or index value. In some implementations, the media source 150 can transmit data directly to the data processing system 105 via a communication interface. In some implementations, the media source 150 can provide frames based on a schedule which is independent from time.

The frame selector 120 can receive the frames from the media source 150 via the network 110. With the receipt of the frames, the frame selector can store and maintain the frames on a computer readable storage, for example the database 115. The frame selector 120 can store and maintain the frames in a temporary buffer. The temporary buffer may be created on a computer storage, for example the database 115 or the memory 825 in conjunction with FIG. 8. The frame selector 120 may also access the database 115 via the network to retrieve one or more frames for processing. The frame selector 120 can store and select frames based on a fingerprint window value. In some implementations, the frame selector 120 can store enough frames to satisfy the selection requirements of the fingerprint window value. The fingerprint window value can be predetermined, received from another computing device via network 110, or received from a component of the data processing system 105. The fingerprint window value can be used to determine which frames in a media stream to select to generate a fingerprint for a respective frame in the media stream. For example, the fingerprint window value may be a temporal value, indicating that frames should be selected within a certain time period relative to the respective frame. The fingerprint window value can be a counter value, indicating that a certain number of frames should be selected from the media stream before or after a respective frame. The fingerprint window value can be an interval value, indicating that a frame should be selected if it corresponds to a timestamp that meets an interval condition (e.g., once every 25 milliseconds). The frame selector 120 can select one or more frames from a media stream received via the network 110 from the media source 150.

For each of the frames received by the media source 150, the frame selector 120 can select a group of frames from the media stream that represent a time period indicated by the fingerprint window value. For example, if the fingerprint window value is three seconds, the frame selector 120 can select a predetermined number of frames within a three for each frame received from the media source 150. The frame selector 150 can store the selected frames in a data structure in volatile or non-volatile computer memory, for example the database 115 or the memory 825 in conjunction with FIG. 8. In some implementations, the frame selector 120 can select frames from the media source 150. The selected frames for each frame of the media stream can be stored by the frame selector 120 in a separate data structure in computer memory. In some implementations, the selected frames for each frame of the media stream can be stored by the frame selector 120 in a single data structure in computer memory. The stored selected frames are associated with the respective frame of the media stream received from the media source 150, for example using a time stamp, a frame index value, or encoded in a position in a data structure or in computer memory, among others.

The frame hasher 125 can hash one or more frames received by the media source 150, or one or more frames retrieved from computer memory, for example the database 115. The frame hasher 125 can hash one or more frames selected by the frame selector 120. The frame selector 120 can provide one or more selected frames to the frame hasher 125. The frame hasher 125 can use one or more hashing algorithms to hash the frames, for example locality sensitive hashing algorithm. A locality sensitive hashing algorithm may be chosen by the frame hasher 125 to allow the data processing system 105 to compare two hashed frames. For example, a locality sensitive hashing algorithm may be chosen to allow the data processing system 105 to compute a similarity value between two frames. The frame hasher 125 may use bit sampling as a locality sensitive hashing algorithm. The frame hasher 125 may use the min-wise independent permutations locality sensitive hashing algorithm. The frame hasher 125 can use other types of locality sensitive hashing algorithms, for example the random projection method. The frame hasher 125 may use a traditional hashing algorithm to hash the frames (e.g., SHA-1, SHA-2, MD5, etc.).

For each frame selected by the frame selector 120, the frame hasher can create a hashed frame using a hashing algorithm. The created hashed frame can have a fixed bit width (e.g., 8-bits, 16-bits, 32-bits, 64-bits, etc.). In some implementations, the created hashed frames can have a variable bit width. In some implementations, the frame hasher 125 can decode or preprocess a frame before applying a hashing algorithm to create a corresponding hashed frame. For example, the frame hasher 125 may decode the frames using a corresponding codec to access the raw frame information before applying the hashing algorithm to the raw frame information to create the hashed frame. The frame hasher 125 can decode and hash audio information, video information, and/or closed captioning information included in the frame, and/or hash the audio information, video information, and/or closed captioning information included in a frame as different hashes. The frame hasher 125 can create and store the hashes in computer memory, for example in the database 115 or in memory 825 in conjunction with FIG. 8. The frame hasher 125 can store the hashed frames in a data structure, for example a C-like data structure or a region of computer memory. The frame hasher 125 may store the hashed frames in a buffer, which may be a temporary region of computer memory used to store data. The frame hasher 125 can associate each of the hashed frames with a corresponding timestamp, index value, or positioning data to indicate the position in the corresponding media stream of the hashed frame. The frame hasher 125 can provide the hashed frames to the fingerprint calculator 130.

The fingerprint calculator 130 can calculate a fingerprint of one or more frames included in a media stream. For example, the fingerprint calculator 130 can process one or more hashes received from the frame hasher 125 to calculate a fingerprint corresponding to a period of time in the media stream to which the one or more frames belong. The fingerprint calculator 130 can calculate a fingerprint for each of the frames in the media stream received from the media source 150. In some implementations, the fingerprint calculator 130 can calculate a fingerprint based on one or more framed hashes retrieved from a computer storage, for example the database 115 or the memory 825 in conjunction with FIG. 8. The fingerprint calculator 130 can store each calculated fingerprint in computer storage, for example in a data structure. The fingerprint calculator 130 can store the calculated fingerprints or a data structure including one or more calculated fingerprints in a computer storage, for example the database 115 or the memory 825 in conjunction with FIG. 8.

The fingerprint calculator 130 can truncate each of the hashed frames created by the frame hasher 125 corresponding to the frames selected by the frame selector 120 to generate truncated hashed frames. Truncating the hashed frames can include selecting a fixed range of bits in the hashed frame, for example the 8 least significant bits. Truncating the hashed frames can include storing the truncated bits in a data structure in computer memory, for example the database 115 or memory 825 in conjunction with FIG. 8. For example, if a hashed frame has a binary value of 01100100, the fingerprint calculator can truncate the hashed frame by selecting the four most significant bits, which in this example are 0110. Truncating the hashed frame can reduce the overall size of the hashed frame while still maintaining enough information for further processing, which is an improvement over other implementations. In some implementations, the fingerprint calculator 130 can skip performing the truncation step, and instead use the entire hashed frame for further processing. In some implementations, the truncating a hashed frame can include selecting any combination of bits in the hashed frame to generate a truncated hash. For example, if a hashed frame has a binary value of 00110001, the fingerprint calculator 130 can select the each bit in positions 6, 4, 2, and 0 to generate a truncated hashed frame with a value of 0101. The fingerprint calculator 130 can further process the truncated hashed frames to calculate a frame fingerprint value.

The fingerprint calculator 130 can concatenate truncated hashed frames corresponding to each of the frames selected by the frame selector 120 to calculate a frame fingerprint value corresponding to a period of time in a media stream. In some implementations, the fingerprint calculator 130 can access computer storage to retrieve one or more truncated hashed frames to calculator a fingerprint value. Each of the frames selected by the frame selector 120 can correspond to a period of time in the media stream. Hashing, truncating, and concatenating each of the selected frames can reduce the size of the data in each frame without sacrificing the information necessary to calculate similarity values between each frame. As such, frames may be compared in a manner that is much more computationally efficient than other implementations. Further, transmitting the concatenated, truncated, and hashed frames may use significantly less network bandwidth versus transmitting an entire media stream for comparison, which is an improvement over other implementations. The fingerprint calculator 130 can calculate a fingerprint for each frame in a media stream received from the media source 150. The fingerprint can correspond to a time window, for example three seconds. In this example, each fingerprint can correspond to a window of time after each frame in the media stream (e.g., a sliding window), the window of time equal to about three seconds.

Although three seconds of media information can occupy a significant portion of computer memory, selecting only a few frames from the window, applying a hashing algorithm to each of the selected frames, and truncating each hash corresponding to the window can significantly reduce the storage requirements of the media information. If a locality sensitive hashing algorithm is used, the media information can be compared to other fingerprints to calculate a similarity value indicating the similarity of the media information included in both sets of frames. The fingerprint calculator 130 can calculate the final fingerprint corresponding to the window of media information by concatenating each of the truncated hashed frames together into a single value. For example, if three frames were selected from a window of time in the media stream, and their truncated hashed values were equal to 0110, 0101, and 1000, the fingerprint calculator 130 can concatenate each of these values to generate a fingerprint value of 011001011000. Although in this example the frames are shown to be concatenated in a particular order, it should be understood that each of the truncated hashed frames can be concatenated in any combination or permutation. The fingerprint calculator 130 can associate each of the fingerprint values with a timestamp or index value to indicate the position in the media stream to which the fingerprint corresponds.

The fingerprint calculator 130 can store each of the calculated fingerprint values in computer storage, for example the database 115 or the memory 825 in conjunction with FIG. 8. The fingerprint values can be stored in a data structure in computer memory. The data structure can include a timestamp corresponding to the earliest frame in the fingerprint, along with a value which designates the window of time to which the fingerprint corresponds. The data structure can also include time information indicating the position of the window in the corresponding media stream. The fingerprint calculator 130 can aggregate each of the calculated fingerprint values together in a single data structure. For example, the fingerprint calculator 139 may continuously calculate the fingerprints from a live media stream received from media source 150. In some implementations, the fingerprint calculator 130 can continuously update a data structure including the fingerprints corresponding to the media stream continuously as each fingerprint is calculated. The data structure may be continuously accessed and updated in computer memory, for example in the database 115 or in memory 825 in conjunction with FIG. 8.

The target frame matcher 135 can receive a target timestamp corresponding to a target frame in a media stream, for example a media stream received by media source 150. In some implementations, the target timestamp can include an indication of a target media stream to which the timestamp corresponds. Target timestamp can be a relative time value corresponding to an instant of time in the target media stream. The target timestamp can be an index value corresponding to the target frame in the target media stream. The target frame matcher 135 can receive the target timestamp included in a request for a comparison to another candidate media stream or another operation. The target frame matcher 135 can receive the target timestamp including an indicator of the corresponding target media stream. The target timestamp can correspond to a frame in a target media stream which has been fingerprinted by the fingerprint calculator 130. The target frame matcher 135 can store the target timestamp in a data structure in computer memory, for example the database 115 or the memory 825 in conjunction with FIG. 8. The target frame matcher 135 can receive the target timestamp via the network 110, for example from an external computing device. In some implementations, the target frame matcher 135 can receive the target timestamp from the media source 150.

The target frame matcher 135 can determine a target fingerprint corresponding to the target timestamp and the indicated target media stream received by the target frame matcher 135. The target frame matcher 135 can access computer memory to retrieve one or more fingerprints corresponding to the media stream to determine the target fingerprint. For example, the target frame matcher 135 can access the database 115, which can contain a data structure including fingerprints indexed by timestamp. In this example, the target frame matcher can determine the target fingerprint by accessing the database entry at the index value equal to the target timestamp received by the target frame matcher 135. In some implementations, the fingerprints can be indexed by a different value. The target frame matcher can search the data structure containing fingerprints corresponding to the target media stream to determine which of the fingerprints has a corresponding timestamp or index value that is closest to the target timestamp or index value. In some implementations, the target timestamp or index value can correspond to the fingerprint which covers a period of time including the target timestamp. In some implementations, the target frame matcher 135 can determine the target fingerprint to be the fingerprint whose representative period of time (e.g., window) is most closely bisected by the target timestamp. For example, if the target timestamp indicates a frame which is exactly ten seconds from the first frame of a media stream, then the target frame matcher 135 can determine the target fingerprint to be the fingerprint which represents the time period of 8.5 seconds to 11.5 seconds of the media stream (e.g., the window value of the fingerprint is 3 seconds). In this example, the target frame matcher 135 determined the target fingerprint to be the fingerprint whose window is bisected by the frame corresponding to the target timestamp, because 10 seconds falls exactly between 8.5 seconds and 11.5 seconds.

The target frame matcher 135 can access computer storage to retrieve a candidate set of fingerprints. In some implementations, the candidate set of fingerprints corresponds to a candidate media stream. In some other implementations, the candidate set of fingerprints can correspond to the target media stream indicated by the target timestamp. In this way, the data processing system 105 can compute matching fingerprint values from different media streams and the same media stream, and take advantage of the observation that segments of interest may be repeated across one or more media streams. In some implementations, the candidate set of fingerprints can be generated by the fingerprint calculator 130 based on a candidate media stream received by the media source 150. The target frame matcher 135 can retrieve the candidate set of fingerprints from a database, for example the database 115. In some implementations, the target frame matcher 135 can retrieve the candidate set of fingerprints from a computer memory, for example the memory 825 in conjunction with FIG. 8. Each of the fingerprints in the candidate set of fingerprints can correspond to a frame and a window of time in a media stream, for example a media stream received by media source 150. The fingerprints in the candidate set of fingerprints can be indexed by a timestamp value, by an index value corresponding to the position of the related frame in the corresponding media stream, or by another value. The target frame matcher 135 can store the retrieved candidate set of fingerprints in a computer storage for further processing, for example the memory 825 in conjunction with FIG. 8 or in the database 115.

The target frame matcher 135 can compare the target fingerprint determined based on the target timestamp with each of the candidate set of fingerprints to determine a match position in the candidate media stream. A match position can indicate that the frames in the window of time indicated by the target fingerprint have been repeated in the candidate media stream. In some implementations, the candidate media stream can be the same as the target media stream indicated by the target fingerprint, but at a different period of time. In this way, the data processing system 105 can identify a matching fingerprint which has been repeated in the same media stream or in one or more different media streams. The target frame matcher 135 can determine the position by calculating a similarity value (e.g., Hamming distance, other locality based hash distance values, etc.) for each of the candidate set of fingerprints when compared to the target fingerprint. If the target frame matcher 135 determines that the similarity value between the target fingerprint and one of the frames in the candidate set of fingerprints is greater than or equal to a predetermined similarity threshold, the target frame matcher 135 can access the value of the timestamp corresponding to the respective fingerprint in the candidate set of fingerprints. If the target frame matcher 135 determines that the similarity value is less than the predetermined similarity threshold, the target frame matcher 135 can continue to compute the similarity value for other fingerprints associated with the candidate media stream. In some implementations, if the target frame matcher 135 determines that there are no matching fingerprints in the candidate set of fingerprints, the target frame matcher can retrieve another candidate set of fingerprints from the database 115 or other computer storage, for example memory 825 in conjunction with FIG. 8.

The value of the match timestamp can be an index value corresponding to the index of the frame in the candidate media stream corresponding to the candidate set of fingerprints. The index value can be a value which indicates the position of the fingerprint in the candidate media stream. For example, an index value of zero can indicate that the fingerprint corresponds to the first frame in the candidate media stream, an index value of 1 can indicate the fingerprint corresponds to the second frame in the media stream, and so on. The value of the match timestamp can also indicate the exact time which the frame appears in the candidate media stream. The value of the match timestamp can be a relative time value (e.g., the first frame having a relative timestamp of zero), or the value of the timestamp can be the absolute time (e.g., a time-of-day maintained on the data processing system 105, a time-of-day value maintained on the media source 150, or the absolute time-of-day the corresponding frame appeared in a broadcast, etc.) the matching fingerprint window appeared in the candidate media stream.

The bounds calculator 140 can enumerate the candidate fingerprints which correspond to the frames in the candidate media stream before and after the match timestamp for further comparison with the target media stream. The bounds calculator 140 can also enumerate the fingerprints that correspond to the frames before and/or after the target timestamp in the target media stream. The target timestamp received by the target frame matcher 135 can correspond to a frame in a segment of interest. The bounds calculator 140 can calculate the upper and lower bounds of the segment of interest by comparing the fingerprints in the target media stream and the candidate media stream.

The bounds calculator 140 can match at least one of the fingerprints of the target media stream with at least one of the fingerprints of the candidate media stream to determine a lower-bound timestamp of the segment of interest. The bounds calculator 140 can access the candidate fingerprint of the frame in the candidate media stream which immediately precedes the match frame determined by the target frame matcher 135. The bounds calculator 140 can access the candidate fingerprint from computer storage, for example the database 115 or the memory 824 in conjunction with FIG. 8. The bounds calculator 140 can access the fingerprint of the frame in the target media stream which immediately precedes the target frame determined by the target frame matcher 135. The bounds calculator 140 can access the fingerprint by accessing computer storage, for example the database 115 or the memory 825 in conjunction with FIG. 8. Upon accessing both the candidate fingerprint and the fingerprint of the target media stream, the bounds calculator 140 can compare the two fingerprints to determine a lower-bound timestamp. In some implementations, comparing the two fingerprints includes calculating a fingerprint similarity value (e.g., Hamming distance, other locality based hash distance values, etc.). If the fingerprint similarity value is greater than or equal to a predetermined threshold, the bounds calculator 140 can determine that the two fingerprints are sufficiently similar. If the similarity value is less than the predetermined threshold, the bounds calculator 140 can determine that the two fingerprints are not sufficiently similar. In some implementations, the bounds calculator 140 can determine the two fingerprints are not sufficiently similar if they do not exactly match. If the bounds calculator 140 determines that the two fingerprints are sufficiently similar, the bounds calculator can access the fingerprints immediately preceding the compared fingerprints in each of the candidate media stream and the target media stream, and perform a comparison as detailed herein. In this way, the bounds calculator 140 can compare each frame in the two media streams starting from the match position and ending at the beginning of the streams until a non-match has occurred or the beginning of at least one stream has been reached. The non-match can occur when the two fingerprints of the two media streams are not sufficiently similar, or when the beginning of either the candidate media stream or the target media stream has been reached.

If the bounds calculator 140 determines that a non-match has occurred, the bounds calculator 140 can retrieve the timestamp corresponding to the candidate fingerprint used in the previously matched comparison. The bounds calculator 140 can retrieve the timestamp from data structure including the candidate fingerprint determined to be sufficiently similar to the target media stream from computer storage, for example the database 115 or memory 825 in conjunction with FIG. 8. Because the bounds calculator 140 has determined that a non-match has occurred between the two streams, the segment of interest (e.g., the segment repeated across two or more media streams) can begin at the frame indicated by the timestamp included in the last matching fingerprint. By accessing the timestamp of the last matching fingerprint, the bounds calculator can determine the lower-bound of the segment of interest in the candidate media stream. In some implementations, the bounds calculator 140 can calculate the lower-bound by accessing the timestamp associated with the last matching fingerprint in the target media stream.

The bounds calculator 140 can match at least one of the fingerprints of the target media stream with at least one of the fingerprints of the candidate media stream to determine an upper-bound timestamp of the segment of interest in at least one of the media streams. The bounds calculator 140 can access the candidate fingerprint of the frame in the candidate media stream which immediately follows the match frame determined by the target frame matcher 135. The bounds calculator 140 can access the candidate fingerprint from computer storage, for example the database 115 or the memory 824 in conjunction with FIG. 8. The bounds calculator 140 can access the fingerprint of the frame in the target media stream which immediately follows the target frame determined by the target frame matcher 135. The bounds calculator 140 can access the fingerprint by accessing computer storage, for example the database 115 or the memory 825 in conjunction with FIG. 8. Upon accessing both the candidate fingerprint and the fingerprint of the target media stream, the bounds calculator 140 can compare the two fingerprints to determine an upper-bound timestamp. In some implementations, comparing the two fingerprints includes calculating a fingerprint similarity value (e.g., Hamming distance, other locality based hash distance values, etc.). If the fingerprint similarity value is greater than or equal to a predetermined threshold, the bounds calculator 140 can determine that the two fingerprints are sufficiently similar. If the similarity value is less than the predetermined threshold, the bounds calculator 140 can determine that the two fingerprints are not sufficiently similar. In some implementations, the bounds calculator 140 can determine the two fingerprints are not sufficiently similar if they do not exactly match. If the bounds calculator determines that the two fingerprints are sufficiently similar, the bounds calculator can access the fingerprints immediately following the compared fingerprints in each of the candidate media stream and the target media stream, and perform a comparison as detailed herein. In this way, the bounds calculator 140 can compare each frame in the two media streams starting from the match position and ending at the last frame of the streams until a non-match has occurred, or the last frame of at least one stream has been reached. The non-match can occur when the two fingerprints of the two media streams are not sufficiently similar, or when the last frame of either the candidate media stream or the target media stream has been reached.

If the bounds calculator 140 determines that a non-match has occurred, the bounds calculator 140 can retrieve the timestamp corresponding to the candidate fingerprint used in the previously matched comparison. The bounds calculator 140 can retrieve the timestamp from a data structure including the candidate fingerprint determined to be sufficiently similar to the target media stream from computer storage, for example the database 115 or memory 825 in conjunction with FIG. 8. Because the bounds calculator 140 has determined that a non-match has occurred between the two streams, the segment of interest (e.g., the segment repeated across two or more media streams) can end at the frame indicated by the timestamp included in the last matching fingerprint. By accessing the timestamp of the last matching fingerprint, the bounds calculator can determine the upper-bound of the segment of interest in the candidate media stream. In some implementations, the bounds calculator 140 can calculate the upper-bound by accessing the timestamp associated with the last matching fingerprint in the target media stream.

The segment extractor 145 can extract the segment of interest based on the lower-bound timestamp and the upper-bound timestamp. The upper-bound timestamp and the lower-bound timestamp can correspond to either the candidate media stream or the target media stream. In some implementations, the frames of the candidate media stream and/or the target media stream is stored in a computer storage, for example the database 115 or the memory 825 in conjunction with FIG. 8. In some implementations, the segment extractor 145 can access all of the frames with timestamp values including and between the lower and upper bound timestamp values determined by the bounds calculator 140. The segment extractor 145 can retrieve the accessed frames in order to assemble a frame-accurate segment of interest, which has been extracted based on the repeated frames in one or more media streams. In some implementations, the segment extractor 145 can access all of the fingerprint values with timestamp values including and between the lower and upper bound timestamp values determined by the bounds calculator 140. The segment extractor 145 can retrieve the accessed fingerprints in order to assemble a frame-accurate segment of interest, which has been extracted based on the repeated fingerprints in one or more media streams. The segment extractor 145 can assemble the segment of interest based on the retrieved frames or the retrieved fingerprint values.

The segment extractor 145 can provide the extracted media segment for storage in a database, for example database 115. The extracted media segment can be one or more frames, or one or more fingerprint values representing the frames in the segment of interest. In some implementations, the segment extractor 145 can transmit the segment of interest to a third-party, for example to a third-party computing device via network 110. In some implementations, the segment extractor 145 can provide the extracted segment of interest to the media source 150 via the network 110. In some implementations, providing the segment of interest can include providing the one or more media frames of the segment of interest. In some implementations, providing the segment of interest can include providing one or more fingerprints corresponding to the one or more frames of the segment of interest. In some implementations, providing the segment of interest can include providing timestamps for each of the frames and/or fingerprints included in the segment of interest. In some implementations, providing the segment of interest can include metadata about the segment of interest (e.g., duration, content, the media stream(s) containing the segment, absolute timestamp corresponding to the segment, relative timestamp corresponding to the timestamp, etc.). In some implementations, providing the segment of interest can include storing the metadata, fingerprints, and/or frames associated with the segment of interest in a data structure in computer memory, for example the database 115 or the memory 825 in conjunction with FIG. 8.

Figure 2:
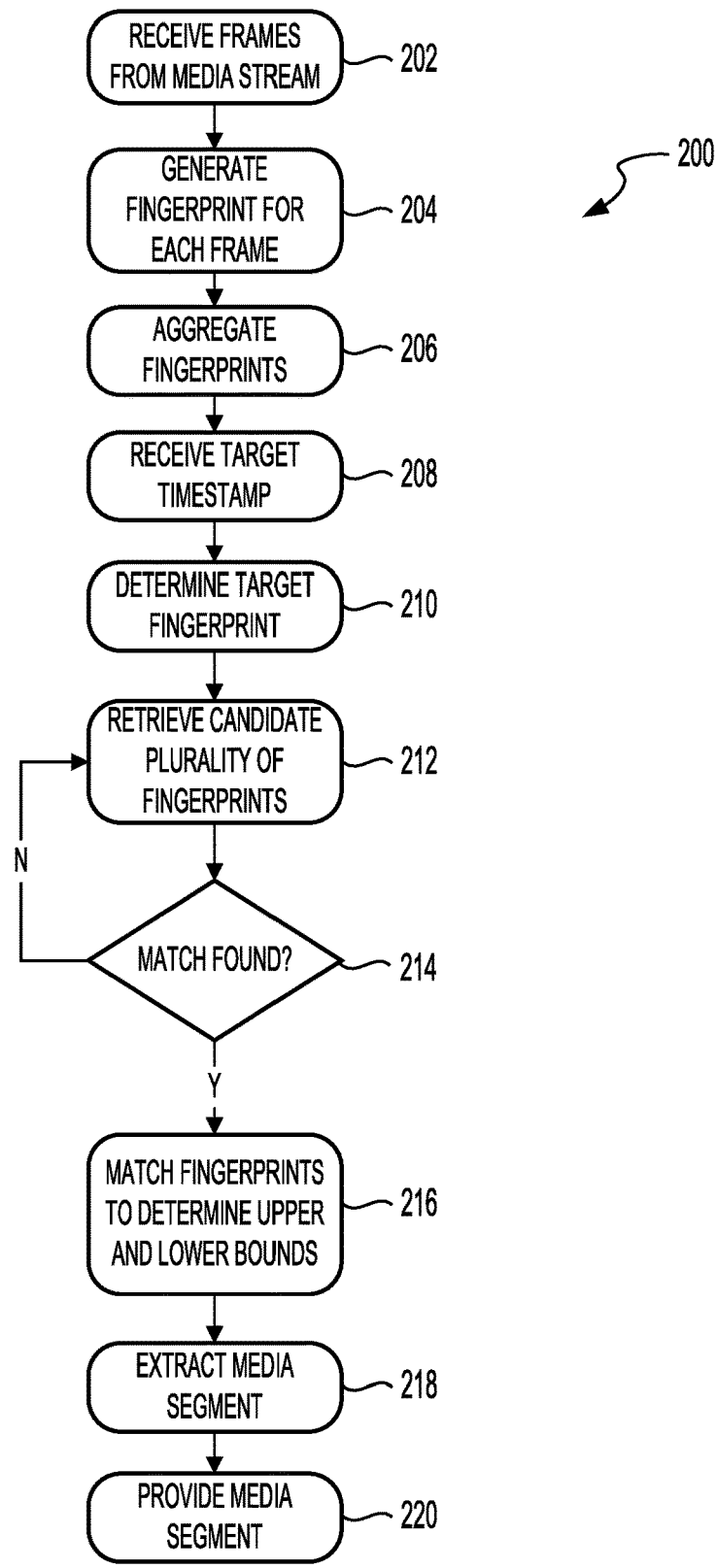
FIG. 2 shows a flow diagram of an example method of frame-accurate extraction of media segments based on fingerprint matching.

Referring now to FIG. 2, depicted is a flow diagram of a method for frame-accurate extraction of media segments based on fingerprint matching. The method 200 can be implemented or performed using the data processing system 105 described herein above in conjunction with FIG. 1 or the computer system 800 described herein below in conjunction with FIG. 8. In brief overview, a data processing system can receive frames from a media stream (202). The data processing system can generate a fingerprint for each frame (204). The data processing system can aggregate the fingerprints (206). The data processing system can receive a target timestamp (208). The data processing system can determine a target fingerprint (210). The data processing system can retrieve a candidate plurality of fingerprints (212). The data processing system can determine whether matching fingerprint was found (214). The data processing system can match fingerprints to determine upper and lower bounds (216). The data processing system can extract a media segment (218). The data processing system can provide the media segment (220).

The data processing system (e.g., the data processing system 105) can receive frames from a media stream (202). The data processing system can receive one or more media frames included in one or more media streams from at least one media source, for example media source 150. Each media stream can include at least one media frame (sometimes herein generally referred to as a frame), which may be a frame of a video stream, for example an MPEG-4 H.264 video. The frame can include video information, audio information, and closed caption information. The video information may be encoded using a video codec (e.g., H.263, H.264, HEVC, MPEG4, Theora, 3GP, Windows Media 8, QuickTime, MPEG-4, VP8, VP6, MPEG1, MPEG2, MPEG-TS, etc.). The audio information can may be encoded using an audio codec (e.g., MP3, AAC, HE-AAC, AC3, EAC3, Vorbis, WMA, PCM, etc.). The closed caption information may be encoded using a closed caption format (e.g., WEBVTT, CEA-608, CEA-708, DFXP, SAMI, SCC, SRT, TTML, 3GPP, etc.). Each frame can include a timestamp that corresponds to its position in the media stream. The media stream may have a fixed number of frames per unit time, for example twenty-four frames per second. The media stream may be an adaptive bitrate stream. The media stream may be a live video stream, for example an internet video stream, or a live television stream. A live television stream may be received from a cable endpoint serviced by a cable provider, a satellite dish serviced by a satellite service provider, or a television antenna. The data processing system can receive the one or more frames via a communication interface, for example a network or communication bus.

Figure 6:
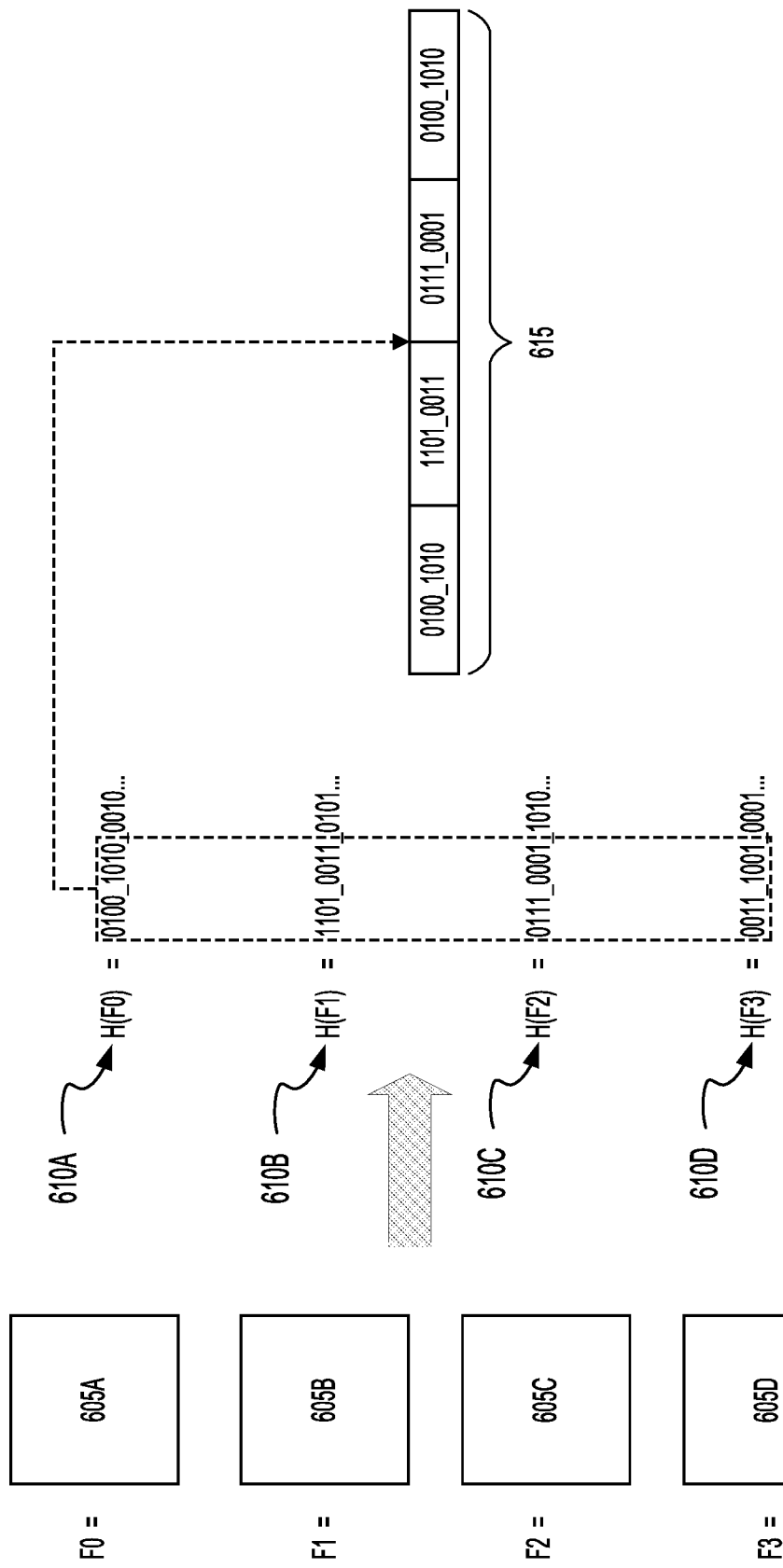
FIG. 6 shows a diagram illustrating an example generation of a fingerprint value based on frames in a media stream.

The data processing system (e.g., the data processing system 105) can generate a fingerprint for each frame (204). The data processing system can perform the steps necessary to generate a fingerprint for each media frame based on a window value, for example using method 204 in conjunction with FIG. 3. An example diagram of this process is illustrated in FIG. 6. In some implementations, the window value can be a value corresponding to a period of time before or after the frame which appears in the corresponding media stream. For example, the window value can be a period of time (e.g., 3 seconds after the selected frame), a number of frames (e.g., 300 frames of the media stream before the selected frame), or a segment of the media stream including the selected frame. Each window of the media stream can correspond to a single frame in the media stream, and each frame in the media stream can be associated with a corresponding window of frames. The fingerprint generated for each frame can be based on the window of frames with which it is associated. The window of frames (e.g., a sliding window) can be based on a predetermined value, or provided with the media stream.

The data processing system (e.g. the data processing system 105) can aggregate fingerprints (206). In some implementations, the fingerprints can be calculated before being aggregated into a final data structure representing the media stream. In some implementations, the fingerprints corresponding to the media stream can be assembled into a data structure in computer memory (e.g., the database 115) as they are calculated by the data processing system. The data processing system can periodically update the data structure which can include the one or more fingerprint values. In some implementations, aggregating the one or more fingerprints values can include associating each of the fingerprint values with a corresponding timestamp. The timestamp can correspond to the frame with which the fingerprint is associated, for example the frame timestamp or the frame index. The frame timestamp can be an absolute timestamp (e.g., the time the frame appeared in the media stream), a relative timestamp (e.g., the amount of time into the media stream when the frame appears), or a frame index value (e.g., the number of the frame in a list of frames ordered by their appearance). The data structure can also include the timestamp values associated with each fingerprint.

The data processing system (e.g. the data processing system 105) can receive a target timestamp (208). The target timestamp can correspond to a certain instant of time in a target media stream. The target media stream can include one or more frames, and each of the frames can include a corresponding time stamp. The target timestamp can be an index value corresponding to a list of frames in the target media stream which are indexed by the index value. The target timestamp can be a relative timestamp, corresponding to a period of time after the first frame in the media stream. For example, the target timestamp could be 5 seconds, meaning the frame that corresponds to the fifth second of the target media stream. The target timestamp can be an absolute timestamp, corresponding to an absolute instant of time when the target media stream was being played (e.g., a live media stream). The data processing system can receive the target timestamp via a network from an external computing device. In some implementations, the data processing system can receive the target timestamp from user input.

The data processing system (e.g. the data processing system 105) can determine a target fingerprint (210). The data processing system can search through the one or more fingerprints generated in step (204) to determine which of the fingerprints correspond to the target timestamp received in step (208). Each of the fingerprints can correspond to a frame in the target media stream indicated by the target timestamp. In some implementations, each of the fingerprints can be associated with a timestamp corresponding to the respective frame in the target media stream. In some implementations, each of the fingerprints can be associated with an index value corresponding to the order of the frames appearance in the media stream. The data processing system can search the fingerprints associated with target media stream and compare the respective associated timestamp with the target timestamp received in step (208). In some implementations, the data processing system can select a target fingerprint from the fingerprints if it is associated with a timestamp which most closely matches the target timestamp. In some implementations, the data processing system can determine the index value of the target fingerprint. In some implementations, the timestamp of a fingerprint must exactly match the target timestamp to be selected as the target fingerprint.

The data processing system (e.g. the data processing system 105) can retrieve a candidate plurality of fingerprints (212). In some implementations, the data processing system can retrieve the candidate fingerprints from a database, for example the database 115. The candidate fingerprints can be associated with a candidate media stream. In some implementations, the candidate media stream can be the same as the target media stream. In some implementations, the candidate media stream can be received from a media source (e.g., media source 150), and the candidate fingerprints can be generated using, for example, method 204 in conjunction with FIG. 3. The candidate plurality of fingerprints can each be associated with a corresponding candidate timestamp. The candidate timestamp can corresponding with a frame in the candidate media stream. In some implementations, the candidate media stream can include a series of frames that may constitute a segment of interest. The segment of interest can also be included in the target media stream.

The data processing system (e.g. the data processing system 105) can determine whether a matching fingerprint was found (214). The data processing system can compare each of the candidate fingerprints retrieved in step (212) to the target fingerprint determined in step (210). The data processing system can use a distance equation associated with the hashing algorithm used to calculate the target fingerprint and each of the candidate fingerprints to determine a similarity value for each of the candidate fingerprints. The similarity value can be calculated for a candidate fingerprint by comparing it to the target fingerprint. If any of the candidate fingerprints are sufficiently similar to the target fingerprint, the data processing system can determine that a matching fingerprint has been found. For example, if the similarity value calculated for a candidate fingerprint is greater than or equal to a predetermined similarity threshold, the data processing system can determine that the respective candidate fingerprint is sufficiently similar to the target fingerprint, and can find a match. When a match has been found, the data processing system can determine the index value of the matching candidate fingerprint, and the data processing system can execute step (216) of the method 200. If none of the candidate fingerprints are sufficiently similar to the target fingerprint, the data processing system can determine that there no match has been found in the candidate fingerprints. If no match has been found in the candidate fingerprints, the data processing system can return to step (212) to retrieve another set of candidate fingerprints associated with another candidate media stream.

Figure 4:
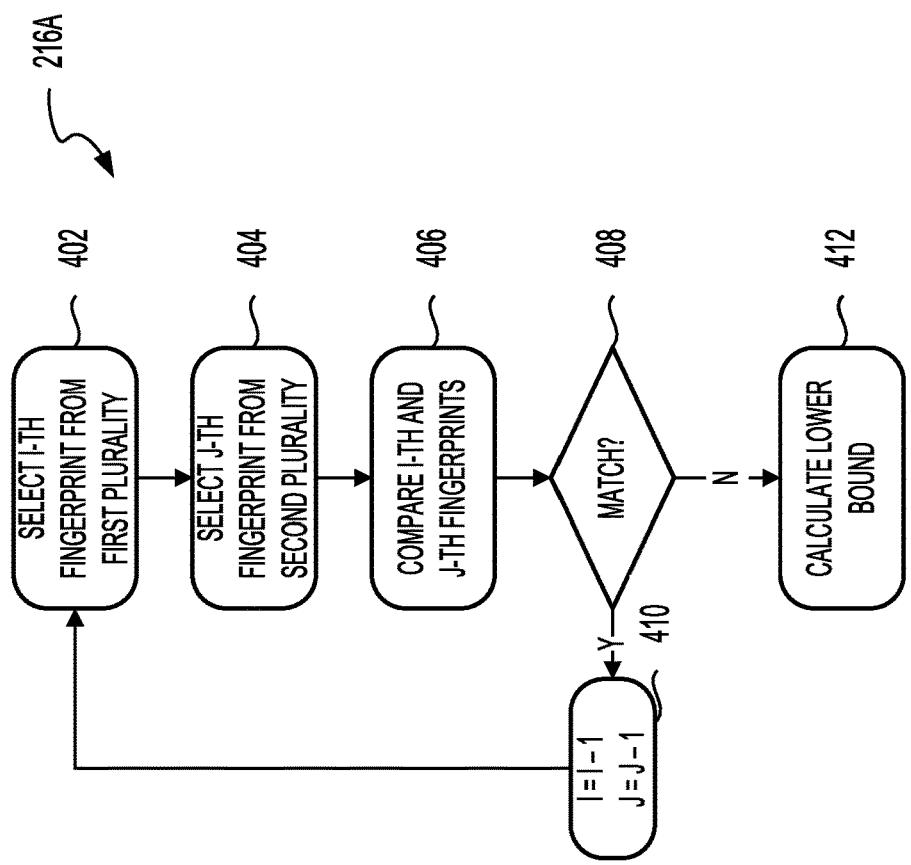
FIG. 4 shows a flow diagram of an example method of determining the lower bound of a matching media segment using two sets of media fingerprints.

The data processing system (e.g. the data processing system 105) can determine upper and lower bounds (216) The data processing system can calculate the lower bound using method 216A in conjunction with FIG. 4. The data processing system can calculate the upper bound using method 216B in conjunction with FIG. 5. The lower bound can correspond to a timestamp in the candidate media stream, the timestamp corresponding to the first frame in a segment of interest in the candidate media stream. The upper bound can correspond to a timestamp in the candidate media stream, the timestamp corresponding to the last frame in the segment of interest in the candidate media stream. The data processing system can calculate the upper and lower bounds by comparing the fingerprints in the target media stream with the fingerprints in the candidate media stream, starting with the target fingerprint and ending with the first and last fingerprint of the segment of interest. The data processing system can determine an upper or lower bound by comparing the candidate media stream and the target media stream until a non-match is found. A non-match between the two streams (e.g., a fingerprint is not sufficiently similar) can mean that the non-matched fingerprint represents a frame which may not be a part of the segment of interest.

The data processing system (e.g. the data processing system 105) can extract a media segment (218). The media segment can be the segment of interest, which can be defined by the upper and lower bounds determined in step (216). The data processing system can extract the media segment by accessing the frames of the media segment, for example the candidate media segment, which include a timestamp that is less than the upper bound timestamp and less that the lower-bound timestamp. In some implementations, the data processing system can access the fingerprints which correspond to the frames which include a timestamp that is less than the upper bound timestamp and greater than the lower bound timestamp. In some implementations, the data processing system can include the frames and/or fingerprints which correspond to the upper and lower bound timestamps in the extracted segment of interest. The data processing system can access the frames and/or fingerprints from computer storage, for example a database (e.g., the database 115) or a computer memory (e.g., memory 825 in conjunction with FIG. 8.).

The data processing system (e.g. the data processing system 105) can provide the media segment (220). The data processing system can provide the media segment which was extracted in step (218). In some implementations, the data processing system can provide the media segment via a computer network (e.g. network 110). In some implementations, the data processing system can provide the media segment via a communications bus. When providing the media segment, the data processing system can provide the frames which comprise the media segment and/or the fingerprints which can correspond to the frames which comprise the media segment. In some implementations, the frames which comprise the media segment can include a corresponding timestamp. In some implementations, providing the media segment can include metadata about the media segment (e.g., duration, content, the media stream(s) containing the segment, absolute timestamp corresponding to the segment, relative timestamp corresponding to the timestamp, etc.). In some implementations, providing the media segment can include storing the metadata, fingerprints, and/or frames associated with the media segment in a data structure in computer memory (e.g. memory 825 in conjunction with FIG. 8) or a database (e.g., database 115).

Figure 3:
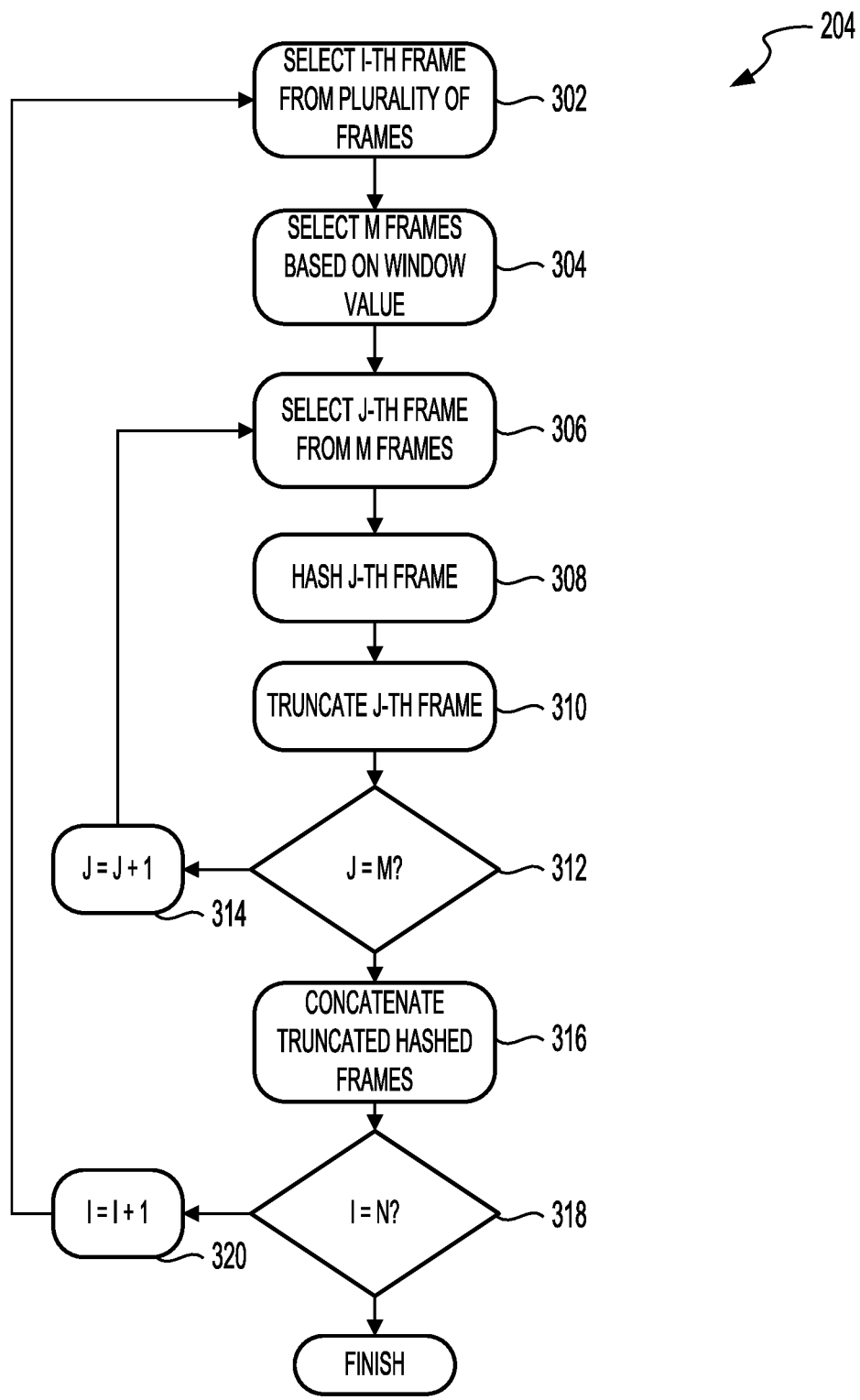
FIG. 3 shows a flow diagram of an example method of generating a fingerprint value for the frames in a media stream.

Referring now to FIG. 3, depicted is a flow diagram of a method 204 for generating a fingerprint value for the frames in a media stream. The method 204 can be implemented or performed using the data processing system 105 described herein above in conjunction with FIG. 1 or the computer system 800 described herein below in conjunction with FIG. 8. The method 204 can be implemented as part of step 204 of method 200 described in conjunction with FIG. 2 above. In brief overview, a data processing system can select the ith frame from a plurality of frames (302). The data processing system can select m frames based on plurality of frames (304). The data processing system can select the jth frame from the m frames (306). The data processing system can hash the jth frame (308). The data processing system can truncate the jth frame (310). The data processing system can determine whether all m frames have been processed (312). The data processing system can increment the counter register j (314). The data processing system can concatenate the truncated hashed frames (316). The data processing system can determine whether all n frames have been processed (318). The data processing system can increment the counter register i (320).

The data processing system can select the ith frame from a plurality of frames (302). In some implementations, i can designate a counter register which indexes the iterations of a loop each time the method 204 is executed. In some implementations, the value of i is used to index the plurality of frames for processing. In some implementations, all iterations of the loop indexed by i can be performed in parallel. In some implementations, in the first iteration of the loop indexed by i in the method 204, the data processing system can select the first frame from the plurality of frames (ith, i=1). It should be understood that the frames can be selected in any order. The data processing system can select each frame from the plurality of frames to generate a respective fingerprint value corresponding to a predetermined window value.

The data processing system can select m frames based on plurality of frames (304). The data processing system can generate a fingerprint for each frame in a media stream. A media stream can include one or more frames. The data processing system can generate a fingerprint based on the respective frame and one or more other frames within a specified window value (e.g., period of time in the media stream, number of frames, sliding window, etc.). The data processing system can select m frames from the frames in the media stream before or after the frame associated with the fingerprint to be generated. For example, the data processing system can select m frames after the ith frame selected in step (302). The m frames can be selected based on a time interval, which can be included in the window value. For example, the window value may be three seconds, designating that m frames can be selected after the selected ith frame. Furthering this example, the window value can specify that the selected m frames can be chosen based on a time interval (e.g., one frame every 0.5 seconds). In this example, m can be equal to six selected frames, which can be selected because there are six frames which satisfy the window condition and the time interval condition. In some implementations, the ith frame can be included in the selected m frames. In some implementations, the data processing system can select frames which are not within the specified window value.

The data processing system can select the jth frame from the m frames (306). In some implementations, j can designate a counter register which indexes the iterations of a loop each time the method 204 is executed. In some implementations, the value of j is used to index the m frames selected in step (304) for processing. In some implementations, all iterations of the loop indexed by j can be performed in parallel. In some implementations, in the first iteration of the loop indexed by j in the method 204, the data processing system can select the first frame from the m selected frames (jth, j=1). It should be understood that the frames can be selected in any order. The data processing system can select each frame from the m selected frames to generate a respective fingerprint value corresponding to a predetermined window value.

The data processing system can hash the jth frame (308). The data processing system can use one or more hashing algorithms or functions to hash the jth frame selected in step (306). In some implementations, the hash function can be a locality-sensitive hashing function. In some implementations, the hash function be another type of hashing function (e.g., SHA-1, SHA-2. MD5, etc.). For example, a locality sensitive hashing algorithm may be chosen to allow the data processing system to compute a similarity value between two frames. The data processing system may use bit sampling as a locality sensitive hashing algorithm. The data processing system may use the min-wise independent permutations locality sensitive hashing algorithm. The data processing system can use other types of locality-sensitive hashing algorithms, for example the random projection method. The hashed frame can have a fixed bit width (e.g., 8-bits, 16-bits, 32-bits, 64-bits, etc.). In some implementations, the hashed frame can have a variable bit width. In some implementations, the data processing system can decode or preprocess a frame before applying a hashing algorithm to create a corresponding hashed frame. For example, the data processing may decode the frames using a corresponding codec to access the raw frame information before applying the hashing algorithm to the raw frame information to create the hashed frame. The data processing system can decode and hash audio information, video information, and/or closed captioning information included in the frame, and/or hash the audio information, video information, and/or closed captioning information included in a frame as different hashes. The data processing system can create and store the hashes in computer memory, for example a database (e.g., database 115) or in computer memory (e.g., memory 825 in conjunction with FIG. 8). The data processing system can store the hashed frame in a data structure, for example a C-like data structure or a region of computer memory. The data processing system may store the hashed frame in a buffer, which may be a temporary region of computer memory used to store data. The data processing system can associate each of the hashed frame with a corresponding timestamp, index value, or positioning data to indicate the position in the corresponding media stream of the hashed frame.

The data processing system can truncate the jth frame (310). The data processing system can truncate the hashed jth frame created in step (308) to generate a jth truncated hashed frame. Truncating the jth hashed frame can include selecting a fixed range of bits in the jth hashed frame, for example the 8 least significant bits. Truncating the jth hashed frame can include storing the truncated bits in a data structure in computer memory (e.g., memory 825 in conjunction with FIG. 8) or a database (e.g., database 115). For example, if the jth hashed frame has a binary value of 01100100, the data processing system can truncate the hashed frame by selecting the four most significant bits, which in this example are 0110. Truncating the jth hashed frame can reduce the overall size of the jth hashed frame while still maintaining enough information for further processing, which is an improvement over other implementations. In some implementations, the data processing system can skip performing the truncation step, and instead use the entire hashed frame for further processing. In some implementations, the truncating the jth hashed frame can include selecting any combination of bits in the jth hashed frame to generate a jth truncated hashed frame. For example, if the jth hashed frame has a binary value of 00110001, the data processing system can select the each bit in positions 6, 4, 2, and 0 to generate a truncated hashed frame with a value of 0101.

The data processing system can determine whether all m frames have been processed (312). Generating the fingerprint for the ith frame selected in step (302) can include generating a truncated hashed frame for each of the m frames selected in step (304). In some implementations, the data processing system can compare the counter register j to the number m to determine if each of the m frames have been processed. In some implementations, the progress of the loop indexed by j is tracked using a data structure. In some implementations, the data processing system can record an entry in the data structure indicating that a corresponding frame of the m frames has been hashed and truncated as in steps (308) and (310) respectively. The data processing system can access the data structure to determine whether all of the m frames have been hashed and truncated. In some implementations, the data processing system can determine that the m frames have been hashed and truncated by comparing the counter register j to the number m. If j is equal to the value m, the data processing system can determine that all m frames have been hashed and truncated, and the data processing system can execute step (316) of the method 204. In such implementations, if counter register j is not equal to the number m, the data processing system can move to step (314).

The data processing system can increment the counter register j (314). The data processing system can increment the counter register j by adding a value of one to the register. In some implementations, the data processing system can record in a data structure that the jth frame has been hashed and truncated as in steps (308) and (310) respectively. After incrementing the counter register j, the data processing system can execute step (306) of the method 204.

The data processing system can concatenate the truncated hashed frames (316). The data processing system can generate a fingerprint representing a window value based on each frame in the media stream. The selected ith frame can be associated with the generated fingerprint. The data processing system can generate the fingerprint associated with the selected ith frame by concatenating each of the m truncated hashed frames generated in steps (306)-(314). The data processing system can calculate the ith fingerprint by concatenating each of the m truncated hashed frames together into a single value. For example, if three frames were selected from a window of time in the media stream (e.g., m=3), and their truncated hashed values were equal to 0110, 0101, and 1000, the data processing system can concatenate each of these values to generate a fingerprint value of 011001011000. Although in this example the m truncated hashed frames are shown to be concatenated in a particular order, it should be understood that each of the truncated hashed frames can be concatenated in any combination or permutation. The data processing system can associate each of the fingerprint values with a timestamp or index value to indicate the position in the media stream to which the fingerprint corresponds.

The data processing system can determine whether all n frames have been processed (318). Generating the fingerprints for each frame in the media stream can include selecting m frames from the media stream, generating a truncated hashed frame for each of the m frames, and concatenating the m truncated hashed frames for each of the n frames in the media stream. In some implementations, the data processing system can compare the counter register i to the number of frames in the media stream n to determine if a fingerprint has been generated for each of then frames. In some implementations, the progress of the loop indexed by i is tracked using a data structure. In some implementations, the data processing system can record an entry in the data structure indicating that a corresponding frame of the m frames has been generated a corresponding fingerprint by the method 204. The data processing system can access the data structure to determine whether a corresponding fingerprint has been generated for each of the n frames. In some implementations, the data processing system can determine that the n frames have been generated a corresponding fingerprint by comparing the counter register i to the number n. If i is equal to the value n, the data processing system can determine that all n frames have been generated a corresponding fingerprint, and the data processing system can finish executing the method 204. In such implementations, if counter register i is not equal to the number n, the data processing system can move to step (320).

The data processing system can increment the counter register i (320). The data processing system can increment the counter register i by adding a value of one to the register. In some implementations, the data processing system can record in a data structure that a corresponding fingerprint has been generated for the ith frame. After incrementing the counter register j, the data processing system can execute step (302) of the method 204.

Referring now to FIG. 4, depicted is a flow diagram of a method 216A for determining the lower bound of a matching media segment. The method 216A can be implemented or performed using the data processing system 105 described herein above in conjunction with FIG. 1 or the computer system 800 described herein below in conjunction with FIG. 8. The method 216A can be implemented as part of step 216 of method 200 described in conjunction with FIG. 2 above. In brief overview, a data processing system can select the ith fingerprint from the first plurality of fingerprints (402). The data processing system can select the jth fingerprint from the second plurality of fingerprints (404). The data processing system can compare the ith and jth fingerprints (406). The data processing system can determine whether there is a match (408). The data processing system can decrement the counter registers i and j (410). The data processing system can calculate the lower bound (412).

The data processing system can select the ith fingerprint from the first plurality of fingerprints (402). In some implementations, the counter value i can be a counter register used to index a loop. The first plurality of fingerprints can be the plurality of fingerprints generated in step (204) of method 200 (herein sometimes generally referred to as the target media stream). The data processing system can select the ith fingerprint to compare to a fingerprint in the candidate plurality of fingerprints retrieved in step (212) to determine the lower bound of a matching segment of interest. In some implementations, each fingerprint can correspond to a single frame in each media stream, meaning that if matching fingerprints are found in two media streams, there can exist matching frames present in each of the two media streams. In some implementation, in the first iteration of the loop, the value of i can be equal to the index value of the target fingerprint determined in step (210) of method 200.

The data processing system can select the jth fingerprint from the second plurality of fingerprints (404). In some implementations, the counter value j can be a counter register used to index a loop. The second plurality of fingerprints can be the candidate plurality of fingerprints retrieved by the data processing system in step (212) of the method 200 (herein sometimes generally referred to as the candidate media stream). The data processing system can select the jth fingerprint to compare to the fingerprint in the plurality of fingerprints generated in step (204) of the method 200, which can correspond to a target media stream. The data processing system can perform iterative comparisons between fingerprints associated with the target media stream and fingerprints associated with the candidate media stream to determine the lower-bound of a segment of interest. In some implementations, each fingerprint can correspond to a single frame in the respective media stream, meaning that if matching fingerprints are found in two media streams, there can exist matching frames present in each of the two media streams. In some implementation, in the first iteration of the loop, the value of j can be equal to the index value of the candidate fingerprint determined in step (214) of method 200.

The data processing system can compare the ith and jth fingerprints (406). The data processing system can determine whether there is a match (408). The data processing system can use a distance equation associated with a hashing algorithm (e.g., the hashing algorithm used to generate each fingerprint) to determine a similarity value for each of the candidate fingerprints. The similarity value can be calculated for a candidate fingerprint by comparing it to the target fingerprint using the distance equation (e.g., Hamming distance, other locality-based hashing algorithm distance functions, etc.). If ith target fingerprint and the jth candidate fingerprint are sufficiently similar, the data processing system can determine that a match has been found. For example, if the similarity value calculated for ith and the jth fingerprints is greater than or equal to a predetermined similarity threshold, the data processing system can determine that the respective jth fingerprint is sufficiently similar to the ith fingerprint, and can find a match. When a match has been found, the data processing system can execute step (410) of the method 216A. If a match has not been found, the data processing system can determine a boundary of the matching segment in the target media stream and the candidate media stream, and execute step (412) of the method 216A.

The data processing system can decrement the counter registers i and j (410). The data processing system can compare each of the candidate and target fingerprints to determine a lower-bound timestamp. In some implementations, the data processing system can start at the fingerprint index values determined in step (210) for the target media stream and in step (214) for the candidate media stream and ending when there is a non-match, or the beginning of one of the streams is reached. To determine the next fingerprint to compare, the data processing system can select the fingerprint with an index value that is next closest to the beginning of each stream (e.g., an index value that is one less than the current index of i and j, for each respective media stream). In some implementations, the data processing system can decrement each of the counter registers i and j by one to determine the next closest fingerprint to the beginning of each media stream. If either the beginning of the target media stream or the beginning of the candidate media stream has been reached (e.g., there are no more fingerprints available for comparison), then the data processing system can determine the lower bound timestamp to be equal to the timestamp associated with the previously compared fingerprint in the candidate media stream. In some implementations, if either the beginning of the target media stream or the beginning of the candidate media stream has been reached, the data processing system can determine the lower bound timestamp to be equal to the timestamp associated with the previously compared fingerprint in the target media stream.

The data processing system can calculate the lower bound (412). If a non-match has occurred between two fingerprints in the first plurality of fingerprints and the second plurality of fingerprints (e.g., the target media stream and the candidate media stream respectively), the data processing system can determine the lower bound of the segment of interest. The segment of interest can be a media segment in the target media stream which is also present in the candidate media stream. The data processing system can compare the fingerprints associated with the target and candidate media streams to determine the boundaries of the matching segment of interest. In some implementations, the lower bound of the segment of interest can be the timestamp which corresponds to the first frame (e.g., the starting frame) of the media segment of interest. In some implementations, the lower bound can correspond to a frame index of the first frame in the segment of interest. When a non-match between two fingerprints has been determined in step (408), the data processing system can access the last matching fingerprint of the candidate media stream (e.g., corresponding to index j+1) to determine the timestamp of the frame corresponding to the fingerprint. In some implementations, the data processing system can access the last matching fingerprint of the target media stream (e.g., corresponding to index i+1) to determine the timestamp of the frame corresponding to the fingerprint. The lower bound can be equal to the timestamp of the last matching fingerprint associated with the candidate media stream. In some implementations, the lower bound can be equal to the timestamp of the last matching fingerprint associated with the target media stream. In some implementations, the lower bound can be equal to the last matching index of the candidate media stream (e.g., j+1). In some implementations, the lower bound can be equal to the last matching index of the target media stream (e.g., i+1). The data processing system can use the lower bound to extract the segment of interest, for example by executing step (218) of method 200.

Figure 5:
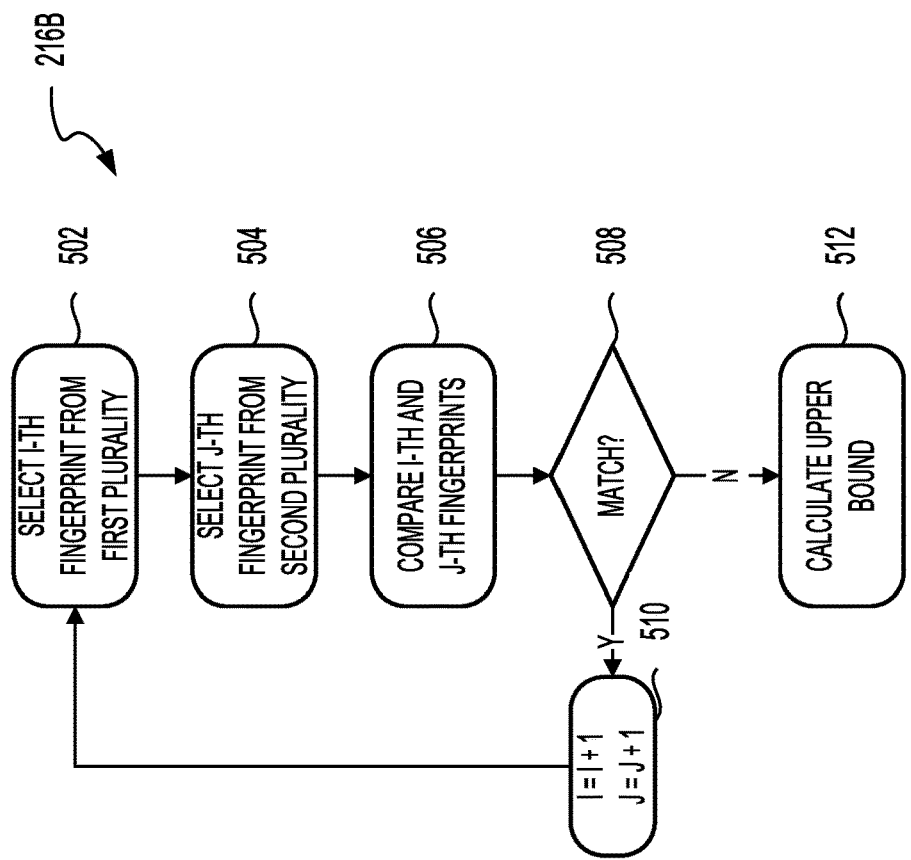
FIG. 5 shows a flow diagram of an example method of determining the upper bound of a matching media segment using two sets of media fingerprints.

Referring now to FIG. 5, depicted is a flow diagram of a method 216B for determining the upper bound of a matching media segment. The method 216B can be implemented or performed using the data processing system 105 described herein above in conjunction with FIG. 1 or the computer system 800 described herein below in conjunction with FIG. 8. The method 216B can be implemented as part of step 216 of method 200 described in conjunction with FIG. 2 above. In brief overview, a data processing system can select the ith fingerprint from the first plurality of fingerprints (502). The data processing system can select the jth fingerprint from the second plurality of fingerprints (504). The data processing system can compare the ith and jth fingerprints (506). The data processing system can determine whether there is a match (508). The data processing system can increment the counter registers i and j (510). The data processing system can calculate the upper bound (512).

The data processing system can select the ith fingerprint from the first plurality of fingerprints (502). In some implementations, the counter value i can be a counter register used to index a loop. The first plurality of fingerprints can be the plurality of fingerprints generated in step (204) of method 200 (herein sometimes generally referred to as the target media stream). The data processing system can select the ith fingerprint to compare to a fingerprint in the candidate plurality of fingerprints retrieved in step (212) to determine the upper bound of a matching segment of interest. In some implementations, each fingerprint can correspond to a single frame in each media stream, meaning that if matching fingerprints are found in two media streams, there can exist matching frames present in each of the two media streams. In some implementation, in the first iteration of the loop, the value of i can be equal to the index value of the target fingerprint determined in step (210) of method 200.

The data processing system can select the jth fingerprint from the second plurality of fingerprints (504). In some implementations, the counter value j can be a counter register used to index a loop. The second plurality of fingerprints can be the candidate plurality of fingerprints retrieved by the data processing system in step (212) of the method 200 (herein sometimes generally referred to as the candidate media stream). The data processing system can select the jth fingerprint to compare to the fingerprint in the plurality of fingerprints generated in step (204) of the method 200, which can correspond to a target media stream. The data processing system can perform iterative comparisons between fingerprints associated with the target media stream and fingerprints associated with the candidate media stream to determine the upper bound of a segment of interest. In some implementations, each fingerprint can correspond to a single frame in the respective media stream, meaning that if matching fingerprints are found in two media streams, there can exist matching frames present in each of the two media streams. In some implementations, in the first iteration of the loop, the value of j can be equal to the index value of the candidate fingerprint determined in step (214) of method 200.

The data processing system can compare the ith and jth fingerprints (506). The data processing system can determine whether there is a match (508). The data processing system can use a distance equation associated with a hashing algorithm (e.g., the hashing algorithm used to generate each fingerprint) to determine a similarity value for each of the candidate fingerprints. The similarity value can be calculated for a candidate fingerprint by comparing it to the target fingerprint using the distance equation (e.g., Hamming distance, other locality-based hashing algorithm distance functions, etc.). If the ith target fingerprint and the jth candidate fingerprint are sufficiently similar, the data processing system can determine that a match has been found. For example, if the similarity value calculated for ith and the jth fingerprints is greater than or equal to a predetermined similarity threshold, the data processing system can determine that the respective jth fingerprint is sufficiently similar to the ith fingerprint, and can find a match. When a match has been found, the data processing system can execute step (510) of the method 216B. If a match has not been found, the data processing system can determine a boundary of the matching segment in the target media stream and the candidate media stream, and execute step (512) of the method 216B.

The data processing system can increment the counter registers i and j (510). The data processing system can compare each of the candidate and target fingerprints to determine an upper-bound timestamp. In some implementations, the data processing system can start at the fingerprint index values determined in step (210) for the target media stream and in step (214) for the candidate media stream and ending when there is a non-match, or the end of one of the media streams is reached. To determine the next fingerprint to compare, the data processing system can select the fingerprint with an index value that is next closest to the end of each stream (e.g., an index value that is one greater than the current index of i and j, for each respective media stream). In some implementations, the data processing system can increment each of the counter registers i and j by one to determine the next closest fingerprint to the end of each media stream. If either the end of the target media stream or the end of the candidate media stream has been reached (e.g., there are no more fingerprints available for comparison), then the data processing system can determine the upper bound timestamp to be equal to the timestamp associated with the previously compared fingerprint in the candidate media stream. In some implementations, if either the beginning of the target media stream or the beginning of the candidate media stream has been reached, the data processing system can determine the lower bound timestamp to be equal to the timestamp associated with the previously compared fingerprint in the target media stream.

The data processing system can calculate the upper bound (512). If a non-match has occurred between two fingerprints in the first plurality of fingerprints and the second plurality of fingerprints (e.g., the target media stream and the candidate media stream respectively), the data processing system can determine the upper bound of the segment of interest. In some implementations, the segment of interest can be a media segment in the target media stream which is also present in the candidate media stream. The data processing system can compare the fingerprints associated with the target and candidate media streams to determine the boundaries of the matching segment of interest. In some implementations, the upper bound of the segment of interest can be the timestamp which corresponds to the last frame (e.g., the final frame) of the media segment of interest. In some implementations, the upper bound can correspond to a frame index of the final frame in the segment of interest. When a non-match between two fingerprints has been determined in step (508), the data processing system can access the last matching fingerprint of the candidate media stream (e.g., corresponding to index j−1) to determine the timestamp of the frame corresponding to the fingerprint. In some implementations, the data processing system can access the last matching fingerprint of the target media stream (e.g., corresponding to index i−1) to determine the timestamp of the frame corresponding to the fingerprint. The upper bound can be equal to the timestamp of the last matching fingerprint associated with the candidate media stream. In some implementations, the lower bound can be equal to the timestamp of the last matching fingerprint associated with the target media stream. In some implementations, the upper bound can be equal to the last matching index of the candidate media stream (e.g., j−1). In some implementations, the upper bound can be equal to the last matching index of the target media stream (e.g., i−1). The data processing system can use the upper bound to extract the segment of interest, for example by executing step (218) of method 200.

Referring now to FIG. 6, depicted is a diagram illustrating an example generation of a fingerprint value based on frames in a media stream. In this illustration, frames 605A-D (herein sometimes generally referred to as frames 605) represent the selected frames used to generate a fingerprint 615. The generated fingerprint 615 can be associated with one of the selected frames, for example the first selected frame 605A. The frames 605A-D can correspond to a period of time in a media stream comprised of more frames (not pictured). Each of the frames 605 can be hashed using a hash function to generate a corresponding hashed frame 610A-D (herein sometimes generally referred to as hashed frames 610). The hashed frames 610 can be a stream of bits with a fixed width. Certain bits (e.g., the most significant bits as pictured) can be selected by a data processing system (e.g., data processing system 105) and concatenated into a corresponding fingerprint 615. Although the illustration depicts the most significant bits of the hashed frames 610 being selected for concatenation, it should be understood that any bits in the hashed frames 610 may be selected for the final fingerprint 615. Likewise, the order of each hashed frame 610 included in the fingerprint 615 can be in any arrangement, order, combination or permutation. In some implementations, more than four frames 605 may be selected for creation of a fingerprint 615. In some implementations, additional metadata may be included in the fingerprint, for example a timestamp referring to the location the fingerprint represents in the corresponding media stream.

Figure 7:
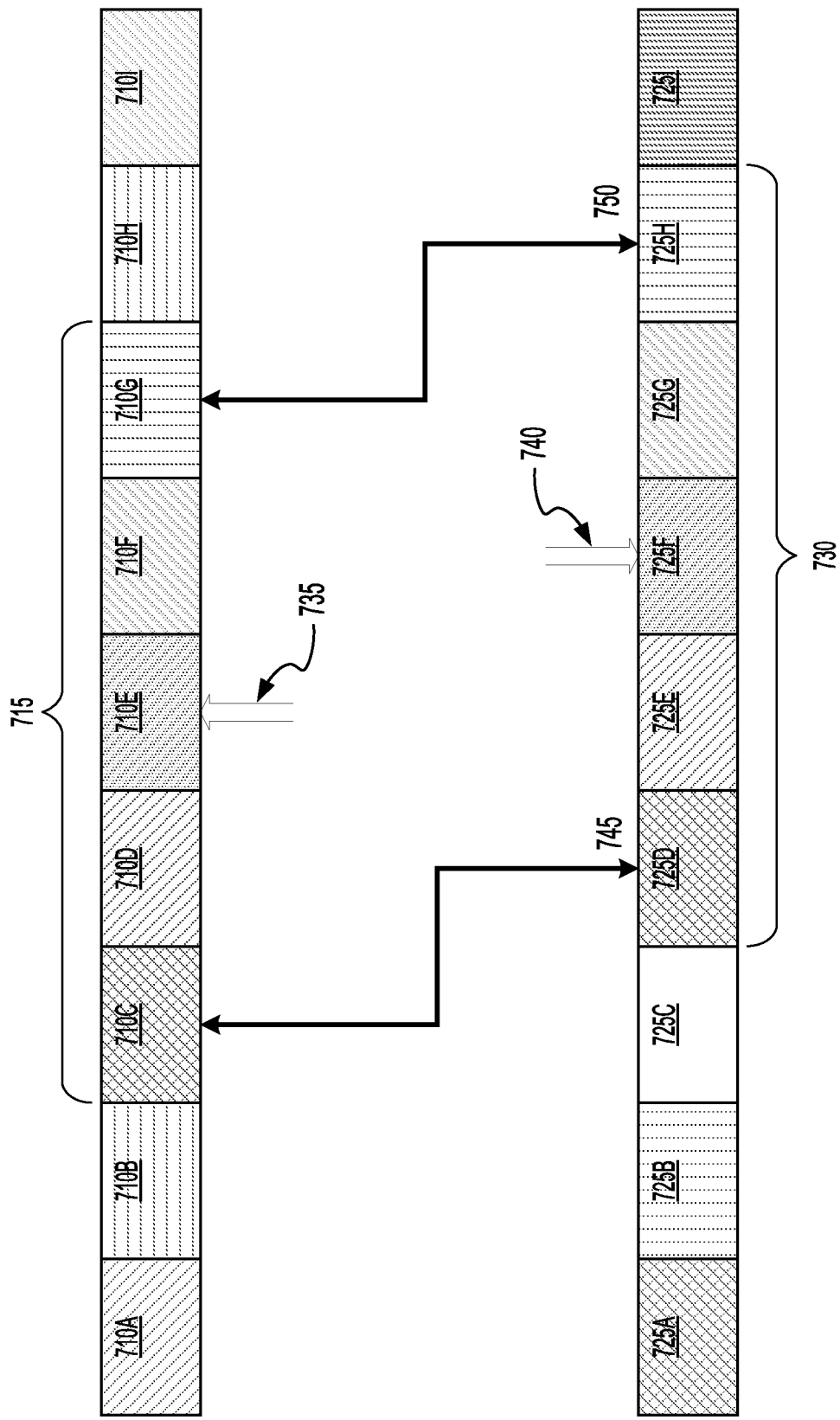
FIG. 7 shows a diagram illustrating an example determination of upper and lower bounds of a matching media segment using two sets of media fingerprints.

Referring now to FIG. 7, depicted is a diagram illustrating an example determination of upper and lower bounds of a matching media segment using two sets of media fingerprints. The diagram includes a first plurality of fingerprints 710A-I (herein sometimes generally referred to as the first plurality of fingerprints 710). The diagram includes a second plurality of fingerprints 725A-I (herein sometimes generally referred to as the first plurality of fingerprints 725). The diagram includes a target segment of interest 715 in the first plurality of fingerprints 710A-I. The diagram includes a candidate segment of interest 730 in the second plurality of frames 725. The diagram includes a target fingerprint index 735. The diagram includes a matching candidate fingerprint index 740. The diagram includes a lower bound index 745. The diagram includes an upper bound index 750.

The data processing system can receive an index of a target fingerprint, for example target fingerprint index 735. The data processing system can compare the target fingerprint 710E to each of the second plurality of fingerprints 725 to determine a candidate fingerprint index 740, which corresponds to the matching fingerprint 725F. To determine the boundaries of the segment of interest 730 in the candidate media stream, the data processing system can compare the first plurality of fingerprints 710 to the second plurality of fingerprints.

To determine the lower bound 745, the data processing system can start at the target fingerprint and the matching candidate fingerprint, and compare the two fingerprints that are next closest to the beginning of each plurality of fingerprints to determine if the fingerprints match. For example, the data processing system can next compare fingerprint 710D in the first plurality and fingerprint 725E in the second plurality. Because these two match, the data processing system can continue to compare the two fingerprints which are next closest to the beginning of each stream, in this example fingerprint 710C and fingerprint 725D. Because the fingerprints 710D and fingerprints 725D match, the data processing system can continue to compare the two fingerprints which are next closest to the beginning of each stream, in this example 710B and 725C. In this example, the fingerprints do not match. As such, the data processing system can determine the lower bound 745 of the segment of interest 730 to correspond to the candidate fingerprint 725D, because it is the last matching fingerprint in the second plurality of fingerprints. In some implementations, the data processing system can determine the lower bound 745 of the segment of interest 715 to correspond to the target fingerprint 710C.

To determine the lower bound 750, the data processing system can start at the target fingerprint and the matching candidate fingerprint, and compare the two fingerprints that are next closest to the end of each plurality of fingerprints to determine if the fingerprints match. For example, the data processing system can next compare fingerprint 710F in the first plurality and fingerprint 725G in the second plurality. Because these two match, the data processing system can continue to compare the two fingerprints which are next closest to the beginning of each stream, in this example fingerprint 710G and fingerprint 725H. Because the fingerprints 710G and fingerprints 725H match, the data processing system can continue to compare the two fingerprints which are next closest to the beginning of each stream, in this example 710H and 725I. In this example, the fingerprints do not match. As such, the data processing system can determine the upper bound 750 of the segment of interest 730 to correspond to the candidate fingerprint 725H, because it is the last matching fingerprint in the second plurality of fingerprints. In some implementations, the data processing system can determine the upper bound 750 of the segment of interest 730 to correspond to the target fingerprint 710G.

FIG. 8 shows the general architecture of an illustrative computer system 1200 that may be employed to implement any of the computer systems discussed herein in accordance with some implementations. The computer system 800 can be used to provide information via the network 810 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included in the data processing system 105 or the other components of the system 800 such as the data processing system 805.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 800 of FIG. 8, the data processing systems can include the memory 825 to store information related to the sets of user identifiers, the generated vectors, among others. The processor(s) 820 shown in FIG. 8 may be used to execute instructions stored in the memory 825 and, in so doing, also may read from or write to the memory various information processed and or generated pursuant to execution of the instructions.

The processor 820 of the computer system 800 shown in FIG. 8 also may be communicatively coupled to or control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 8, one or more communications interfaces facilitate information flow between the components of the system 800. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the user can communicate with the data processing system 800.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing systems 805 can include clients and servers. For example, the data processing systems 805 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 805 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of extracting media segments based on fingerprint matching, comprising:
receiving, by a data processing system having one or more processors, a media stream comprising a plurality of frames;
for each of the plurality of frames:
selecting, by the data processing system, a second plurality of frames from the plurality of frames based on a fingerprint window value;
hashing, by the data processing system, each of the second plurality of frames to create a plurality of hashes;
truncating, by the data processing system, each of the plurality of hashes to generate a plurality of truncated hashes;
concatenating, by the data processing system, the plurality of truncated hashes to calculate a frame fingerprint value, the frame fingerprint value associated with the respective frame in the plurality of frames and a timestamp corresponding to the respective frame;
aggregating, by the data processing system, each of the calculated frame fingerprint values to assemble a plurality of fingerprints;
receiving, by the data processing system, a target timestamp corresponding to a target frame in the plurality of frames;
determining, by the data processing system, a target fingerprint in the plurality of fingerprints based on the target timestamp and the fingerprint window value;
retrieving, by the data processing system, a second plurality of fingerprints, each of the second plurality of fingerprints associated with a frame in a second media stream;
comparing, by the data processing system, the target fingerprint with each of the second plurality of fingerprints to determine a match position corresponding to a position in the second media stream;
matching, by the data processing system, a first fingerprint in the plurality of fingerprints associated with a timestamp that is less than the target timestamp with a second fingerprint of the second plurality of fingerprints to determine a lower-bound timestamp;
matching, by the data processing system, a third fingerprint in the plurality of fingerprints associated with a timestamp that is greater than the target timestamp with a fourth fingerprint of the second plurality of fingerprints to determine an upper-bound timestamp;
extracting, by the data processing system, a media segment from the second media stream based on the lower-bound timestamp and the upper-bound timestamp; and
providing, by the data processing system, the media segment for storage in a database.

2. The method of claim 1, wherein aggregating each of the calculated frame fingerprint values further comprises:
storing, by the data processing system, the plurality of fingerprints in a database.

3. The method of claim 1, wherein retrieving the second plurality of fingerprints further comprises retrieving the second plurality of fingerprints from a database.

4. The method of claim 1, wherein retrieving the second plurality of fingerprints comprises:
receiving, by the data processing system, a third media stream comprising a third plurality of frames;
for each of the third plurality of frames:
selecting, by the data processing system, a fourth plurality of frames from the third plurality of frames based on the fingerprint window value;
hashing, by the data processing system, each of the fourth plurality of frames to create a second plurality of hashes;
truncating, by the data processing system, each of the second plurality of hashes to generate a second plurality of truncated hashes;
concatenating, by the data processing system, the second plurality of truncated hashes to calculate a second frame fingerprint value; and
aggregating, by the data processing system, each of the second frame fingerprint values, each associated with a timestamp corresponding to a respective frame in the third plurality of frames, to assemble the second plurality of fingerprints.

5. The method of claim 1, wherein hashing each of the second plurality of frames comprises hashing each of the second plurality of frames using a locality-sensitive hashing algorithm.

6. The method of claim 1, wherein the second media stream is the same as the first media stream.

7. The method of claim 1, wherein comparing the target fingerprint with each of the second plurality of fingerprints to determine a match position further comprises:
calculating, by the data processing system, a similarity value between the target fingerprint and each of the second plurality of fingerprints.

8. The method of claim 7, further comprising:
determining, by the data processing system, whether the similarity value is equal to or greater than a similarity threshold; and
determining, by the data processing system, the match position corresponding to a position in the second media stream responsive to the similarity value being equal to or greater than the similarity threshold.

9. The method of claim 1, wherein extracting a media segment from the second media stream based on the lower-bound timestamp and the upper-bound timestamp comprises:
extracting, by the data processing system, a third plurality of fingerprints from the second plurality of fingerprints based on the lower-bound timestamp and the upper-bound timestamp; and
storing, by the data processing system, the third plurality of fingerprints in a database.

10. The method of claim 9, further comprising:
providing, by the data processing system, the third plurality of fingerprints.

11. A system comprising one or more processors, the processors configured to:
receive a media stream comprising a plurality of frames;
for each of the plurality of frames:
select a second plurality of frames from the plurality of frames based on a fingerprint window value;

hash each of the second plurality of frames to create a plurality of hashes;
truncate each of the plurality of hashes to generate a plurality of truncated hashes;
concatenate the plurality of truncated hashes to calculate a frame fingerprint value;
aggregate each of the calculated frame fingerprint values, each associated with a timestamp corresponding to a respective frame in the plurality of frames, to assemble a plurality of fingerprints;
associate each of the calculated frame fingerprint values with a respective frame in the plurality of frames;
receive a target timestamp corresponding to a target frame in the plurality of frames;
determine a target fingerprint in the plurality of fingerprints based on the target timestamp and the fingerprint window value;
retrieve a second plurality of fingerprints, each of the second plurality of fingerprints associated with a frame in a second media stream;
compare the target fingerprint with each of the second plurality of fingerprints to determine a match position corresponding to a position in the second media stream;
match a first fingerprint in the plurality of fingerprints associated with a timestamp that is less than the target timestamp with a second fingerprint of the second plurality of fingerprints to determine a lower-bound timestamp;
match a second fingerprint in the plurality of fingerprints associated with a timestamp that is greater than the target timestamp with a third fingerprint of the second plurality of fingerprints to determine an upper-bound timestamp; and
provide the media segment for storage in a database.

12. The system of claim 11, further configured to:
store the plurality of fingerprints in a database.

13. The system of claim 11, further configured to:
retrieve the second plurality of fingerprints from a database.

14. The system of claim 11, further configured to:
receive a third media stream comprising a third plurality of frames;
for each of the third plurality of frames:
select a fourth plurality of frames from the third plurality of frames based on the fingerprint window value;
hash each of the fourth plurality of frames to create a second plurality of hashes;
truncate each of the second plurality of hashes to generate a second plurality of truncated hashes;
concatenate the second plurality of truncated hashes to calculate a second frame fingerprint value; and
aggregate each of the second frame fingerprint values, each associated with a timestamp corresponding to a respective frame in the third plurality of frames, to assemble the second plurality of fingerprints.

15. The system of claim 11, further configured to:
hash each of the second plurality of frames using a locality sensitive hashing algorithm.

16. The system of claim 11, wherein the first media stream is the same as the second media stream.

17. The system of claim 11, further configured to:
calculate a similarity value between the target fingerprint and each of the second plurality of fingerprints.

18. The system of claim 11, further configured to:
determine whether the similarity value is equal to or greater than a similarity threshold; and
determine the match position corresponding to a position in the second media stream responsive to the similarity value being equal to or greater than the similarity threshold.

19. The system of claim 11, further configured to:
extract a third plurality of fingerprints from the second plurality of fingerprints based on the lower-bound timestamp and the upper-bound timestamp; and
store the third plurality of fingerprints in a database.

20. The system of claim 19, further configured to:
provide the third plurality of fingerprints.

* * * * *